(12) United States Patent
Reynolds

(10) Patent No.: US 8,392,265 B2
(45) Date of Patent: Mar. 5, 2013

(54) SYSTEMS AND METHODS FOR COLLECTING TELEVISION VIEWING DATA AND TELEVISION INTERACTIVITY

(76) Inventor: Edward Reynolds, Anaheim, CA (US)

( * ) Notice: Subject to any disclaimer, the term of this patent is extended or adjusted under 35 U.S.C. 154(b) by 583 days.

(21) Appl. No.: 12/536,488

(22) Filed: Aug. 6, 2009

(65) Prior Publication Data

US 2011/0035766 A1 Feb. 10, 2011

(51) Int. Cl.
*G06Q 30/00* (2006.01)
(52) U.S. Cl. ...................................................... 705/26.1
(58) Field of Classification Search .................. 705/26.1, 705/37
See application file for complete search history.

(56) References Cited

U.S. PATENT DOCUMENTS

2005/0049957 A1* 3/2005 Vakili et al. ..................... 705/37

* cited by examiner

*Primary Examiner* — Mila Airapetian
(74) *Attorney, Agent, or Firm* — Heidi Eisenhut; Loza & Loza LLP

(57) ABSTRACT

A system for collecting viewing data (or viewing habits) and automatically measuring the size of an audience viewing or watching a broadcast at any particular time is provided. In the system, a remote control device may be adapted to collect and manage the collection of the viewing data on television audiences, including requests for the data from third parties. The data may be collected using a remote control device and then transmitted to a remote computer where it may be stored and accumulated, so that over time, the viewing habits of the User may be identified. The remote control device may also be used to allow a User to interact with the television to order a product, monetize advertising, participate in an auction and/ or rate a television program.

23 Claims, 22 Drawing Sheets

SYSTEMS AND METHODS FOR COLLECTING TELEVISION VIEWING DATA AND TELEVISION INTERACTIVITY

FIELD

The present application relates to communication systems, and more particularly, to systems and methods for collecting television viewing data, and interacting with a television as it relates to advertising, auction, product ordering, and rating of programs.

BACKGROUND

Television ratings, which reflect the average size of the audience of a television broadcast, are very valuable to an advertiser because they tell the size of the audience for the advertiser's commercial. The fees that a television or broadcast station charges to broadcast an advertisement on the air are largely dependent upon the ratings, so it is important to accurately measure the ratings.

One existing method of measuring an audience size is using an audience research company, such as Nielsen Media Research. Nielsen Television Ratings are generally gathered in one of two ways. One way is with the use of diaries that are kept by viewers, i.e. a target audience self-records its viewing habits. Audience research companies randomly select a limited number of people to maintain a written log or diary for a specified time period, such as for a week, for describing their viewing habits, i.e., each television or broadcast station watched. At the end of the specified period, the completed diaries are returned to the audience research company which then manually compiles the data. These habits can be broken down by demographic and sometimes psychographic information to help broadcasters and advertisers determine who is watching rather than just how many. By targeting various demographics, advertisers can be provided with the types of audiences of any given show, network, and programming hour.

In addition to the use of diaries, audience research companies can also gather viewing data using small devices connected to televisions in selected homes. These devices gather the viewing habits of the home and transmit the information nightly to the audience research company through a "Home Unit" connected to a phone line. The technology-based home unit system is meant to allow market researchers to study television viewing habits on a minute to minute basis, seeing the exact moment viewers change channels or turn off their TV. Both of these existing methods are inherently inaccurate because they depend on the measurement company's ability to select a representative group of people who ostensibly represent the likes and dislikes of the hugely larger actual audience, and the diligence of the participants. Furthermore, these prior art methods are also flawed due to the limited number of participants.

Consequently, a system and method for measuring the audience size of television broadcasts which alleviates the problems inherent in conventional methods as described previously is needed.

SUMMARY

In one aspect, a viewing data collection system for automatically measuring the size of an audience viewing or watching a broadcast at any particular time is provided. In the system, a remote control device may be adapted to collect and manage viewing data on television audiences, including requests for the data from third parties. The data may be collected using a remote control device and then transmitted to a remote computer where it may be stored and accumulated, so that over time, the viewing habits of the User may be identified.

In another aspect, a method for collecting viewing data is provided. The method includes selecting a channel on a viewing device using a remote control device; recording the channel selected in a memory device located in the remote control device; accumulating a pre-determined number of channel selections in the memory device of the remote control device; transferring the accumulated channel selections to a remote computer for managing the accumulated channel selections; and tabulating the accumulated channel selections to determine the viewing data, the viewing data identifying a number of viewers watching television broadcasts.

In yet another aspect, a system for collecting viewing data is provided. The system includes a remote computer which includes a memory device; and a processor coupled with the memory device. The processor configured to receive a pre-determined number of channel selections from a remote control device, the remote control device accumulates the pre-determined number of channel selections as a user changes channels on a viewing device; tabulate the pre-determined number of channel selections to determine the viewing data; and a data collection storage device, coupled to the remote computer, for storing the viewing data.

In yet another aspect, a method for participating in an auction using a viewing device is provided. The method includes selecting a channel using a remote control device to view an auction program; recording the channel selected in a memory device of the remote control device along with time and date the channel was selected; selecting an auction button on the remote control device indicating an interest in participating in the auction; sending the channel selected and the date and time the channel was selected to a remote computer; retrieving auction information from a library database, coupled to the remote computer, using the channel selected and the date and time the channel was selected to identify the auction; and displaying the auction on the viewing device for participation by the user.

In yet another aspect, a method for rating a television broadcast using a viewing device is provided. The method includes prompting a user to enter number of individuals watching the viewing device; recording the number in a memory device of the remote control device; selecting a channel on the viewing device using the remote control device; recording the channel selected in the memory device located in the remote control device, along with time and date the channel was selected; establishing a communication link between the remote control device and a remote computer and transmitting channel data to the remote computer, the channel data including the channel selected and the number of individuals watching the television broadcast; selecting a ratings button on the remote control device indicating an interest in rating the television broadcast; entering a rating of the television broadcast using the remote control device and storing the rating in the memory device of the remote control device; transferring the rating to the remote computer; and tabulating ratings received from a plurality of users.

BRIEF DESCRIPTION OF THE DRAWINGS

The features, nature, and advantages of the present aspects may become more apparent from the detailed description set

DETAILED DESCRIPTION OF THE INVENTION

Figure 1:
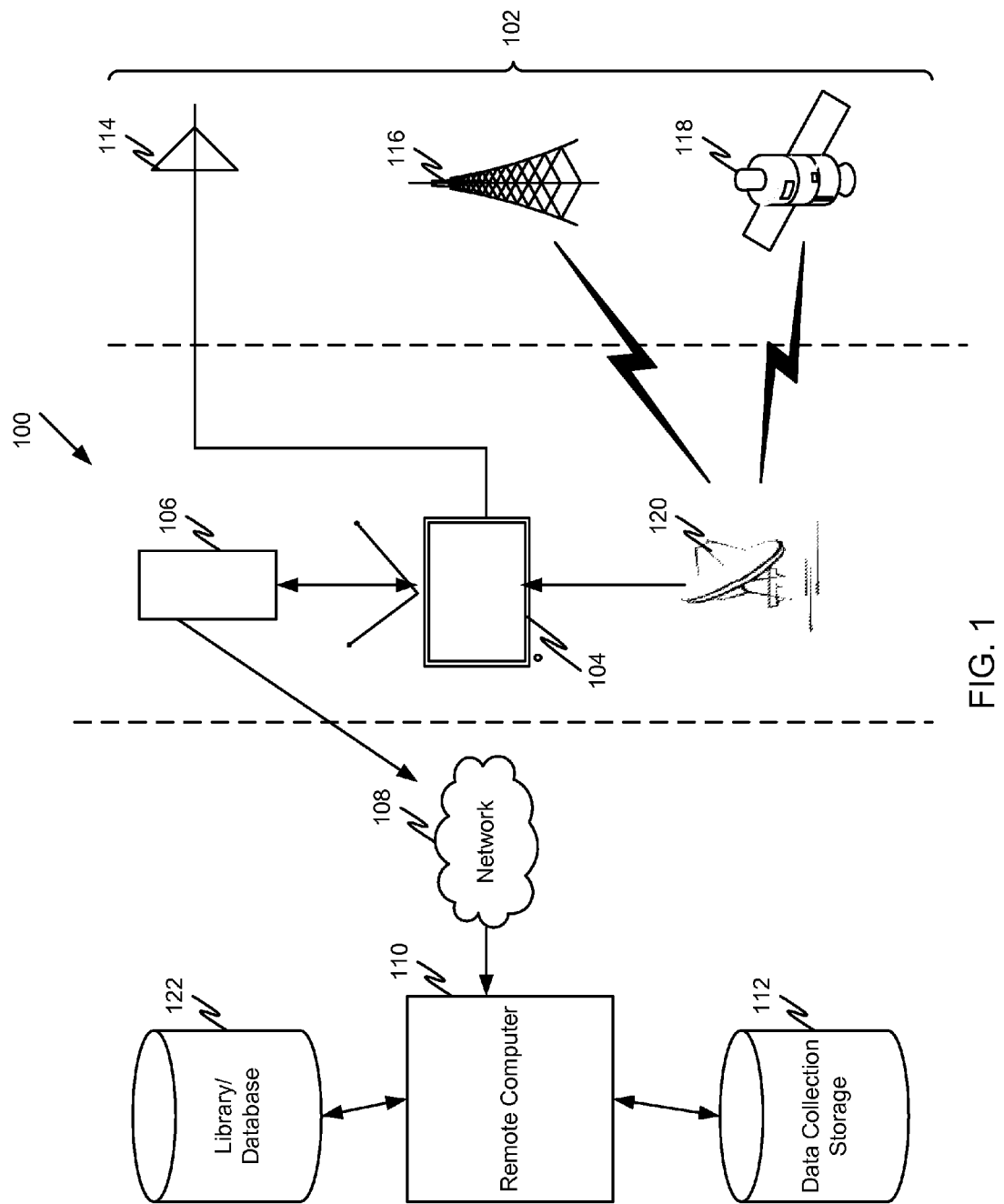
FIG. 1 illustrates a broadcast system, in accordance with an exemplary embodiment.

The following detailed description is of the best currently contemplated modes of carrying out the invention. The description is not to be taken in a limiting sense, but is made merely for the purpose of illustrating the general principles of the invention.

In the following description, specific details are given to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, structures and techniques may be shown in detail in order not to obscure the embodiments.

Also, it is noted that the embodiments may be described as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

Moreover, a storage medium may represent one or more devices for storing data, including read-only memory (ROM), random access memory (RAM), magnetic disk storage mediums, optical storage mediums, flash memory devices and/or other machine readable mediums for storing information. The term "machine readable medium" includes, but is not limited to portable or fixed storage devices, optical storage devices, wireless channels and various other mediums capable of storing, containing or carrying instruction(s) and/or data.

Furthermore, embodiments may be implemented by hardware, software, firmware, middleware, microcode, or any combination thereof. When implemented in software, firmware, middleware or microcode, the program code or code segments to perform the necessary tasks may be stored in a machine-readable medium such as a storage medium or other storage(s). A processor may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The various illustrative logical blocks, modules, circuits, elements, and/or components described in connection with the examples disclosed herein may be implemented or performed with a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing components, e.g., a combination of a DSP and a microprocessor, a number of microprocessors, one or more microprocessors in conjunction with a DSP core, or any other such configuration.

The methods or algorithms described in connection with the examples disclosed herein may be embodied directly in hardware, in a software module executable by a processor, or in a combination of both, in the form of processing unit, programming instructions, or other directions, and may be contained in a single device or distributed across multiple devices. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor.

The term "communication system" refers to a physical device capable of receiving and/or transmitting wired or wireless signals, such as voice and/or data signals or messages. The term "viewing device", after adapted, refers to any type of telecommunication medium for transmitting and receiving still or moving images, either monochromatic ("black and white") or color. The term "broadcasting station" or "broadcast station" may refers to a cable television service provider, a radio frequency (RF) television service provider, a satellite television service provider or any other service provider the is capable of broadcasting both audio and video to television receivers.

In one aspect, a viewing data collection system for automatically measuring the size of an audience viewing or watching (hereinafter used interchangeably) a broadcast at any particular time is provided. In the system, a remote control device may be adapted to collect and manage the collection of the viewing data on television audiences, including requests for the data from third parties. The data may be collected using a remote control device and then transmitted to a remote computer where it may be stored and accumulated, so that over time, the viewing habits of the User may be identified. The remote control device may also be used to allow a User to interact with the television to order a product, retrieve information on an advertisement, participate in an auction and/or rate a television program.

FIG. 1 illustrates a communication or viewing data collection system 100 in accordance with an exemplary embodiment. The system 100 may include, for example, a service provider 102, a television or viewing device 104 (hereinafter used interchangeably) and a remote control device 106. The remote control device 106 may be used to collect viewing information or data of viewers or Users (hereinafter used interchangeably). The remote control device 106 may provide this viewing information, as well as other tuning and/or demographic data, via a network 108 to a remote computer 110 which may serve to manage the collection of viewing data on television audiences and manage requests for data from third parties, including but not limited to advertisers and broadcast stations. (Alternatively, the viewing device 104 may provide the viewing data to the remote computer 110.) The viewing data observed on the television 104 may be stored in a database or data collection storage device 112 for later retrieval, compilation and analysis by a research audience company, television station or any other person or group of people with an interest in the viewing data. The viewing data collected may include viewing behavior, i.e., what television station the television 104 was tuned to and when, as well as geographic and demographic information about viewing audiences. This collected data may be used for marketing and research by advertisers and others. Additionally, the remote computer 110 may transmit information or data to the viewing device, including, but not limited to advertising, and instructions for the User/viewer.

The network 108 may be implemented using any desired combination of hardwired and wireless communication links, including for example, the Internet, an Ethernet connection, a digital subscriber line (DSL), a telephone line, a cellular telephone system, a coaxial cable, etc.

The service provider 102 may be implemented by any service provider such as, for example, a cable television service provider 114, a radio frequency (RF) television service provider 116, and/or a satellite television service provider 118. The television 104 receives a plurality of television signals transmitted via a plurality of channels by the service provider 102 and may be adapted to process and display television signals provided in any format such as a National Television Standards Committee (NTSC) television signal format, a high definition television (HDTV) signal format, an Advanced Television Systems Committee (ATSC) television signal format, a phase alteration line (PAL) television signal format, a digital video broadcasting (DVB) television signal format, an Association of Radio Industries and Businesses (ARIB) television signal format, etc. The television 104 may utilize a receiver dish 120 and may receive the signals from the radio frequency (RF) television service provider 116, and/or the satellite television service provider 118.

The user-operated remote control device 106 allows a User to cause the television 104 to tune to and receive signals transmitted on a desired channel, and to cause the television 104 to process and present the programming content contained in the signals transmitted on the desired channel. The processing performed by the television 104 may include, for example, extracting a video component and/or an audio component delivered via the received signal, causing the video component to be displayed on a screen/display associated with the television 104, and causing the audio component to be emitted by speakers associated with the television 104. The programming content contained in the television signal may include, for example, a television program, a movie, an advertisement, a video game and/or a preview of other programming content that is currently offered or will be offered in the future by the service provider 102.

Additionally, a User may request information on products/services described on the air, order a product/service advertised or bid on a current product/service being auctioned on the television 104. The service provider 102 may store some or all of the information on the products/services described on the air in a library database 122. To download the requested additional information, the viewer may send a request, using the remote control device 106, to the remote computer 110. Once the request is received, the remote computer may search the library database 122 for the additional information. If the additional information is found, the remote computer may notify the viewer that the additional information has been found and may ask the viewer to confirm the request. The advertiser of the products/services, by prior agreement, could be charged for the download, thus monetizing the advertisement.

In operation, as discussed above, the television may receive broadcast signals from the cable television service provider 114, the radio frequency (RF) television service provider 116, and/or the satellite television service provider 118. The television may be located in mobile environments, such as land vehicles, aircraft, watercraft, handheld devices and the like. The television also may be in stationary units for residential uses, such as home entertainment, or commercial uses, such as offices.

The viewing data collection system 100 may also be configured to transmit instructions to Users. Furthermore, the components of the viewing data collection system 100 may be coupled in any well known manner.

Figure 2:
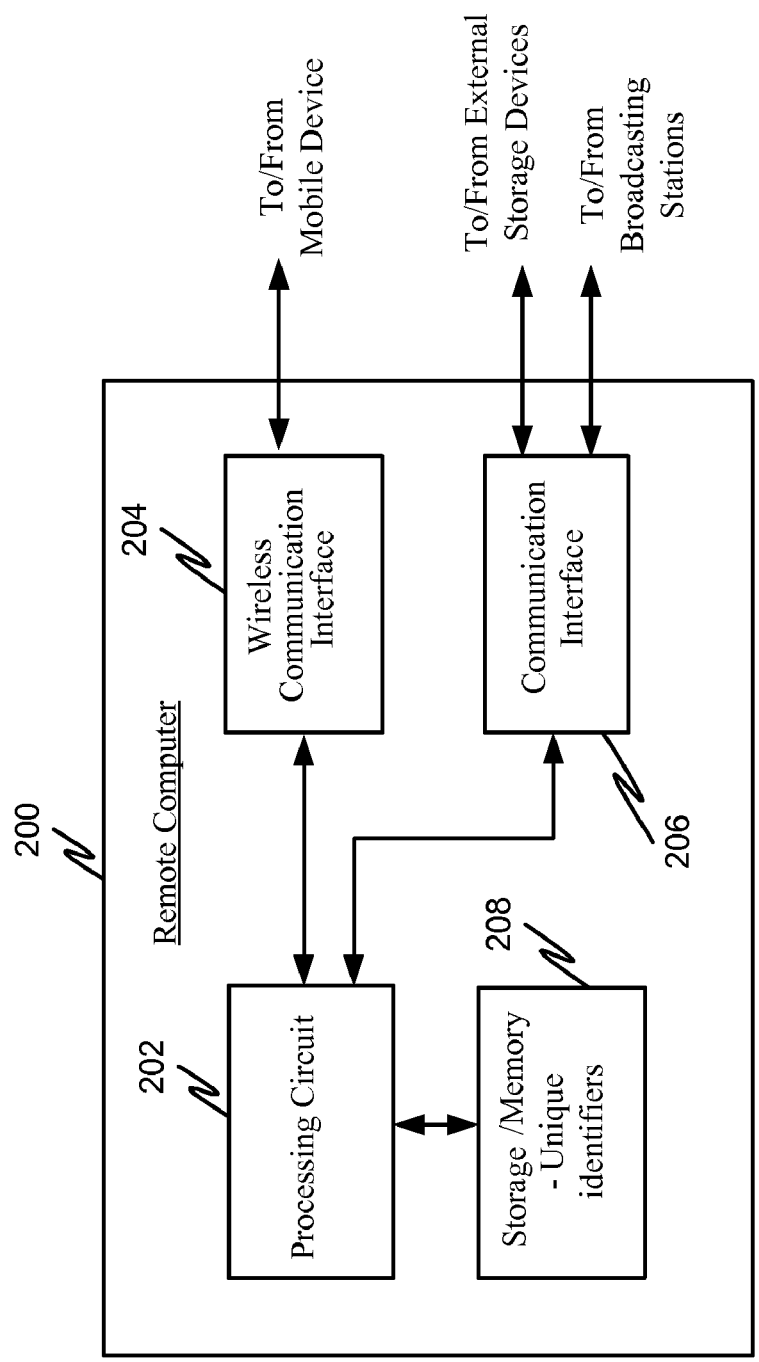
FIG. 2 is a block diagram illustrating a remote computer configured to collect viewing data from, or provide information or data to, one or more remote control devices.

FIG. 2 is a block diagram illustrating a remote computer 200 configured to collect viewing data from, or provide information or data to, one or more remote control devices, external storage devices and/or broadcasting stations. Furthermore, the remote computer may be configured to assist Users with interacting with a television. For example, the User may request information on products/services described on the air, order a product/service advertised or bid on a current product/service being auctioned on the television.

The remote computer 200 may include a processing circuit 202 (e.g., processor, processing module, etc.) coupled to a wireless communication interface 204 to communicate over a wireless network, a communication interface 206 to communicate with external storage devices, such as databases, and/or broadcasting stations, and a storage device 208 to store a list of unique identifiers associated with identified viewing devices and/or remote control devices. The list of unique identifiers may be used as address locations in the external storage devices to store and locate information for that particular viewing device and/or remote control device associated with the unique identifier. The processing circuit 202 may be configured to compile and analyze the data or information, such as television viewing data, for the broadcasting stations, advertisers or others that may request the data.

Figure 3:
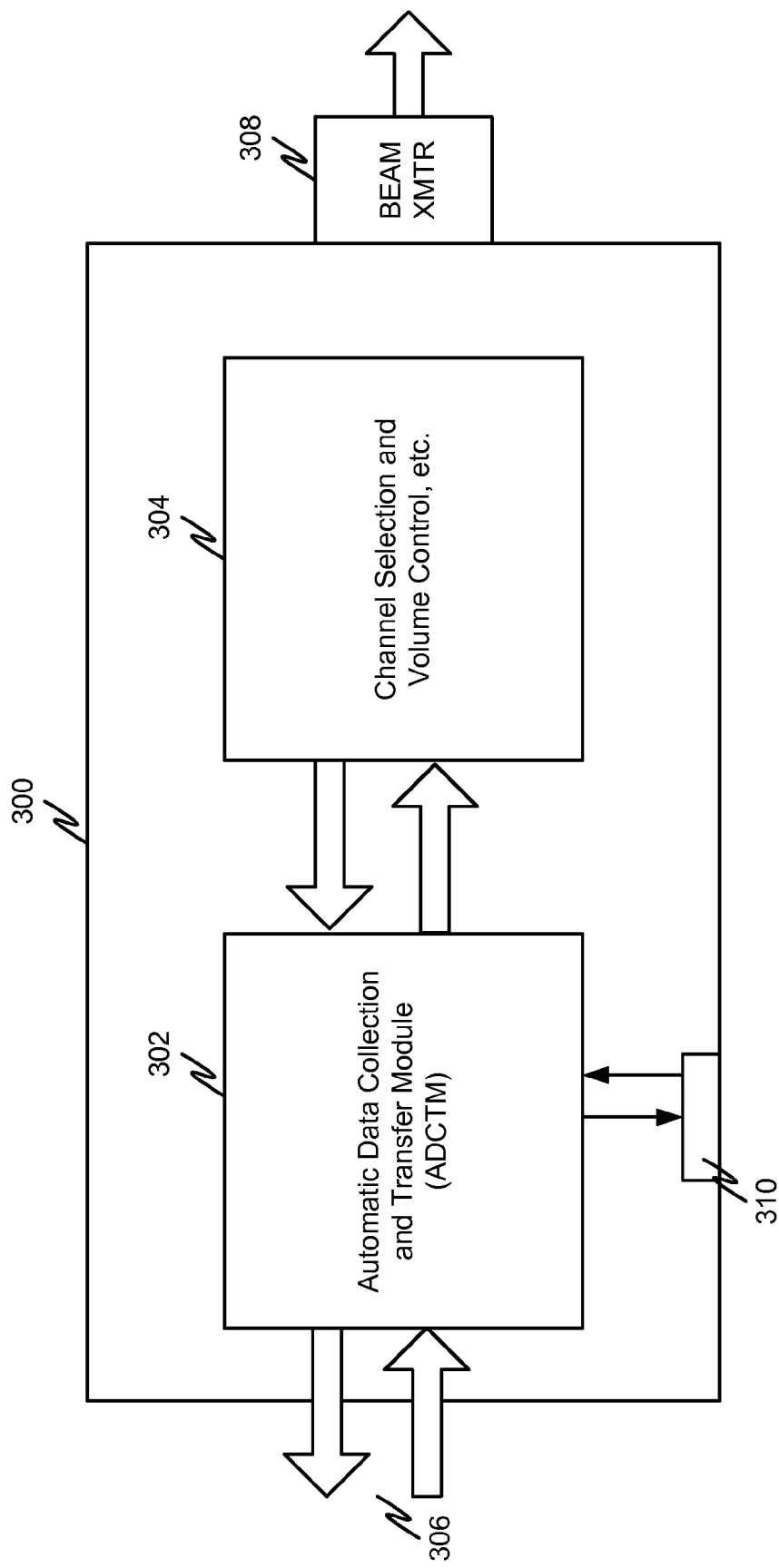
FIG. 3 is a block diagram illustrating an overview of a remote control device configured to communicate with a television (or viewing device) and a local computer, in accordance with one embodiment.

FIG. 3 is a block diagram illustrating an overview of a remote control device 300 configured to communicate with a television (or viewing device) and a local computer, according to one embodiment. The remote control device 300 may include an automatic data collection and transfer module (ADCTM) 302 coupled to a selection module 304. The selection module 304 may detect channel selections/changes, volume control changes, etc. that the User may change and/or modify using a keypad on the remote control device 300.

The ADCTM 302 may be configured to receive viewing data from the selection module 304, determine its identity and compile and transmit this information or data to a remote computer via a local computer or mobile device. User activity may be processed by the ADCTM 302 and sent to the local computer via a communication link 306 which may include an output jack or via a wireless communication, such as a Bluetooth connection. The local computer may then send the data to a remote computer for tabulation.

As the User changes channels using the selection module 304, a transmitter 308 transmits or beams data to a television in a manner known in the art. An output connector 310 may also be included in the remote control device 300 for directly connecting the remote control device 300 to the local or personal computer. The User may download information stored on the remote control device 300 to the local or personal computer and then transfer the data to the remote computer via electronic mail or any other known method for transmitting data.

As described above, the remote control device may also be used to assist Users with interacting with a television. For example, the User may request information on products/services described on the air, order a product/service advertised or bid on a current product/service being auctioned on the television.

Figure 4:
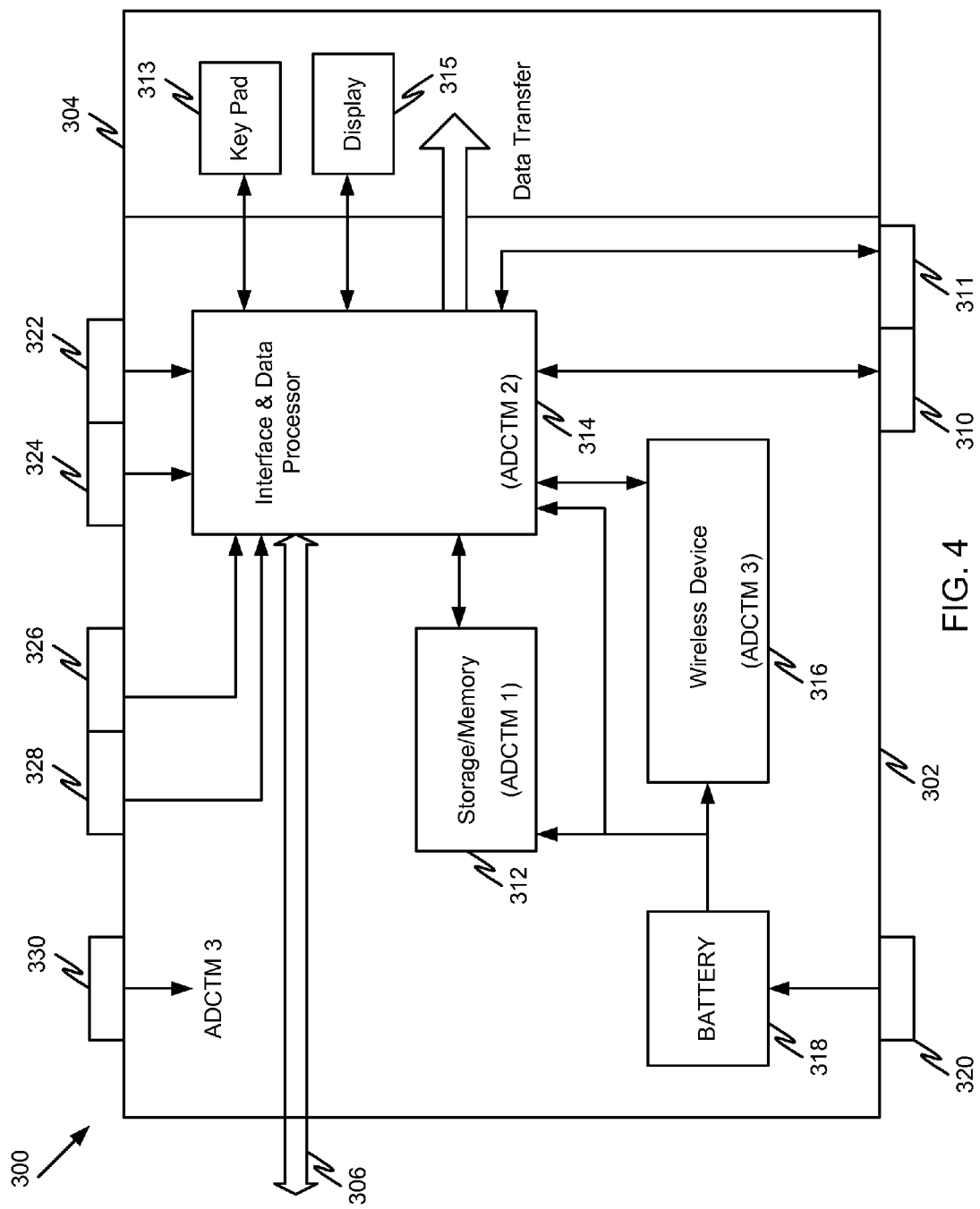
FIG. 4 is a block diagram illustrating the internal structure of the remote control device of FIG. 3.

FIG. 4 is a block diagram illustrating the internal structure of the remote control device 300 of FIG. 3. As described above, the remote control device may include the ADCTM 302 and the selection module 304. The ADCTM 302 may include a rechargeable battery 318 for supplying power to a data storage device (or ADCTM 1) 312 for storing the collected data, an interface and data processor (or ADCTM 2) 314, and a wireless/mobile device (or ADCTM 3) 316 for transmitting the collected data to the remote computer or to the local computer via a wireless connection, such as Bluetooth. The selection module 304 may include a keypad 313 allowing a User to change channels, change the volume of the television, enter data, participate in an auction, rate a television program, order a product and request information, among other things. A display 315 may also be included in the selection module 304 for allowing the User to view data and information, including, but not limited to, the day, time, current channel, history of channels watched, current amount bid on an auction item, etc.

Data, entered using the keypad 315, may be transmitted to the interface and data processor (ADCTM 2) 314 for processing. Upon processing, the data may be sent to the storage device (ADCTM 1) 312, the mobile device (ADCTM 3) 316 for transmission to the remote computer or local computer and/or may be transmitted (or beamed) to a television in a manner known in the art, causing the television to change channels, adjust volume, etc. An On/Off button 330 may be located on the remote control device 300 for turning the wireless/mobile device (or ADCTM 3) 316 On and Off allowing the remote control device to transmit the collected data to the remote computer or the local computer wirelessly.

As the User changes channels, data may be collected by the interface and data processor (ADCTM 2) 314 and stored in the data storage device (ADCTM 1) 312 for later transmission to the remote computer for tabulation. The data storage device (ADCTM 1) 312 may record a pre-determined number of channel changes, for example 100, prior to transmitting the data to the remote computer. Alternatively, the collected data may be transmitted at a specific time or times during the day.

The data collected may include the channel that was watched, how long the User stayed on that channel and how many viewers were watching the same television. In one embodiment, the User may need to stay on a channel for a specified amount of time, for example three (3) seconds, for the data to be collected.

The remote control device 300 may also include one or more connectors for attaching external devices. The connectors may include, but are not limited to, a battery charger connector 320 for recharging the battery, a removable small non-volatile memory chip which may utilize a miniature USB connector or other small connector 311 and an Input/Output connector 310 for connecting to the local computer.

The remote control device 300 may also include one or more buttons which a User may utilize to interact with the viewing data collection system. The buttons may include a Rating button 328 for initiating a rating application (described below) in the viewing data collection system, an Advertisement Interest button 322 for allowing the User to indicate an interest in an advertisement viewed on the television, an Order button 326 for allowing the User to order an advertised product with the selection of a single button and an Auction button 324 for allowing the User to indicate an interest in participating in an auction.

Figure 5:
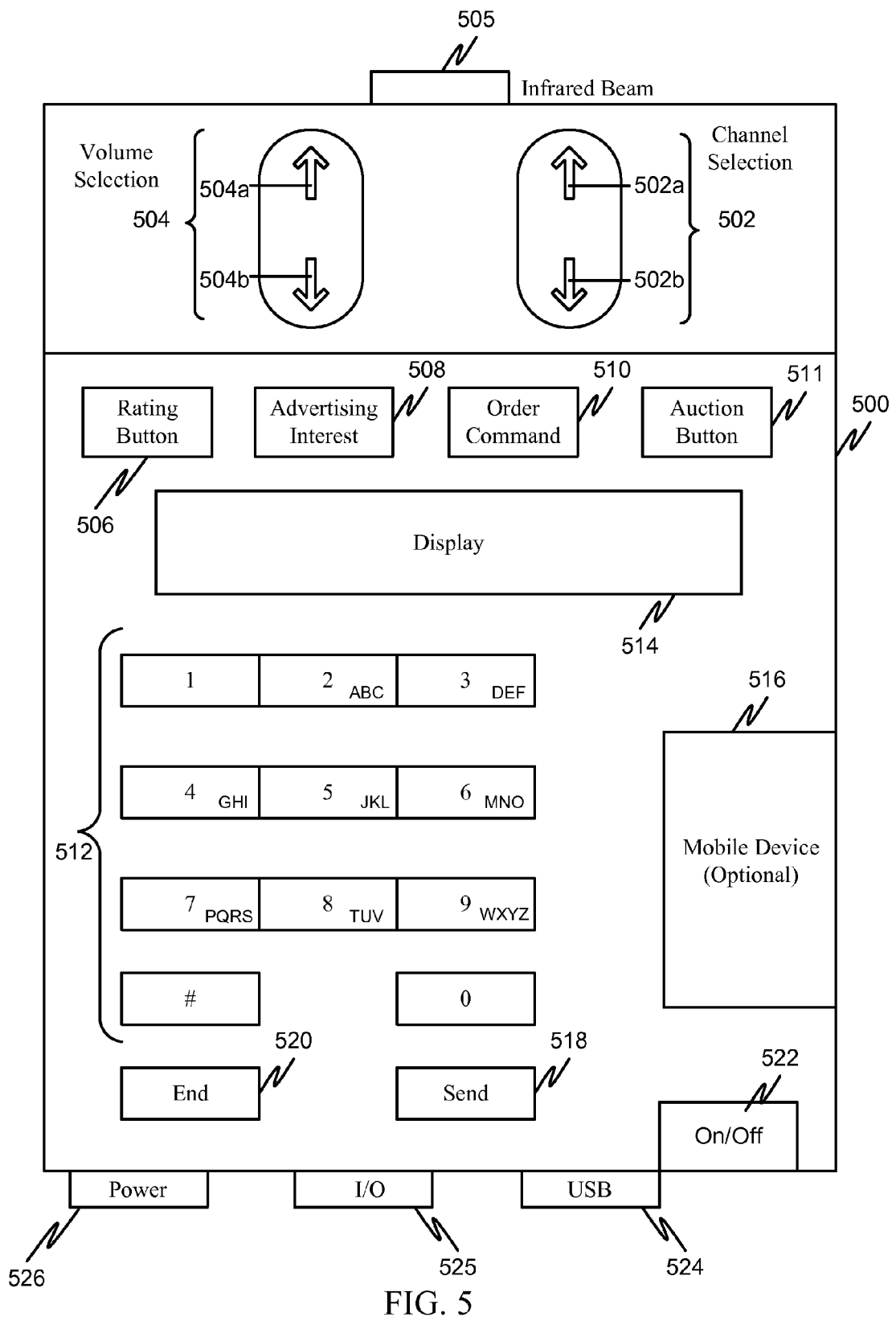
FIG. 5 illustrates a front plan view of remote control device for controlling a viewing device, in accordance with one embodiment.

FIG. 5 illustrates a front plan view of a remote control device 500 for controlling a viewing device, in accordance with one embodiment. As will be explained in greater detail below, the remote control device 500 may be configured to collect user viewing data, allow a user to rate a program being broadcast, bid on a product/service, request additional information on a product/service being advertised and/or order a product/service being advertised.

The remote control device 500 may include one or more connectors. For example, the remote control device may include a connector 524 for connecting a removable small non-volatile memory chip which may utilize a miniature USB connector or other small connector, an Input/output connector 525 for enabling the User to connect the device 500 directly to a local computer to download and upload data via a cable and a connector 526 for connecting a battery charger for recharging batteries in the remote control device 500. The remote control device 500 described herein is merely illustrative and should not be construed as implying any limitations upon the scope of the present invention. Two pairs of arrow keys may be provided for channel selection 502 and volume selection 504. Channel selection keys may include a channel up arrow key 502a and a channel down arrow key 502b while volume selection keys may include a volume up arrow key 504a and a volume down arrow key 504b. The channel up arrow key 502a and the channel down arrow key 502b may also be used to scroll through on-screen options (or menus) and/or to highlight an on-screen option (or menu).

A keypad 512 may be included for allowing a User manual control of the television. The keypad may include ten numeric-key buttons corresponding to numbers 0-9 for entry of a television channel or personal identification number (PIN number). Furthermore, a display 514 may be disposed in the remote control device for displaying information. The information may include, for example, the current day and time, television programming schedule items, instructions for Users, advertisement information, product information, etc.

The remote control device 500 may also include one or more buttons which a User may utilize to interact with a viewing data collection system. The buttons may include an optional wireless device On/Off button 522 for activating/de-activating a wireless/mobile device 516 used to transmit data to a remote computer, a Rating button 506 for initiating a rating application in the viewing data collection system, an Advertising Interest button 508 for requesting additional information on an product or service described in an advertisement, an Order Command button 510 for allowing a User to purchase a product/service that has been advertised and an Auction button 511 for allowing a User to initiate participation in an auction using the viewing device (or television).

Selection of the keys and/or buttons may cause a transmitter 505 to transmit or beam data to a television in a manner known in the art. Furthermore, selection of a SEND button 518 causes data, information and/or instructions to be sent to the television, storage device (ADCTM 1), local computer or remote computer, while an END button 520 may cause an action, such as request for additional information, initiation of rating application, etc., to terminate.

In an alternative embodiment of the invention, different and/or additional systems and methods of providing user input may be used including, for example, a remote control device having different keys and/or key layouts, a keyboard device, a mouse, a voice activated input system, a touchscreen display, etc. The invention described herein is not limited by the type of device used to provide user input.

Figure 6:
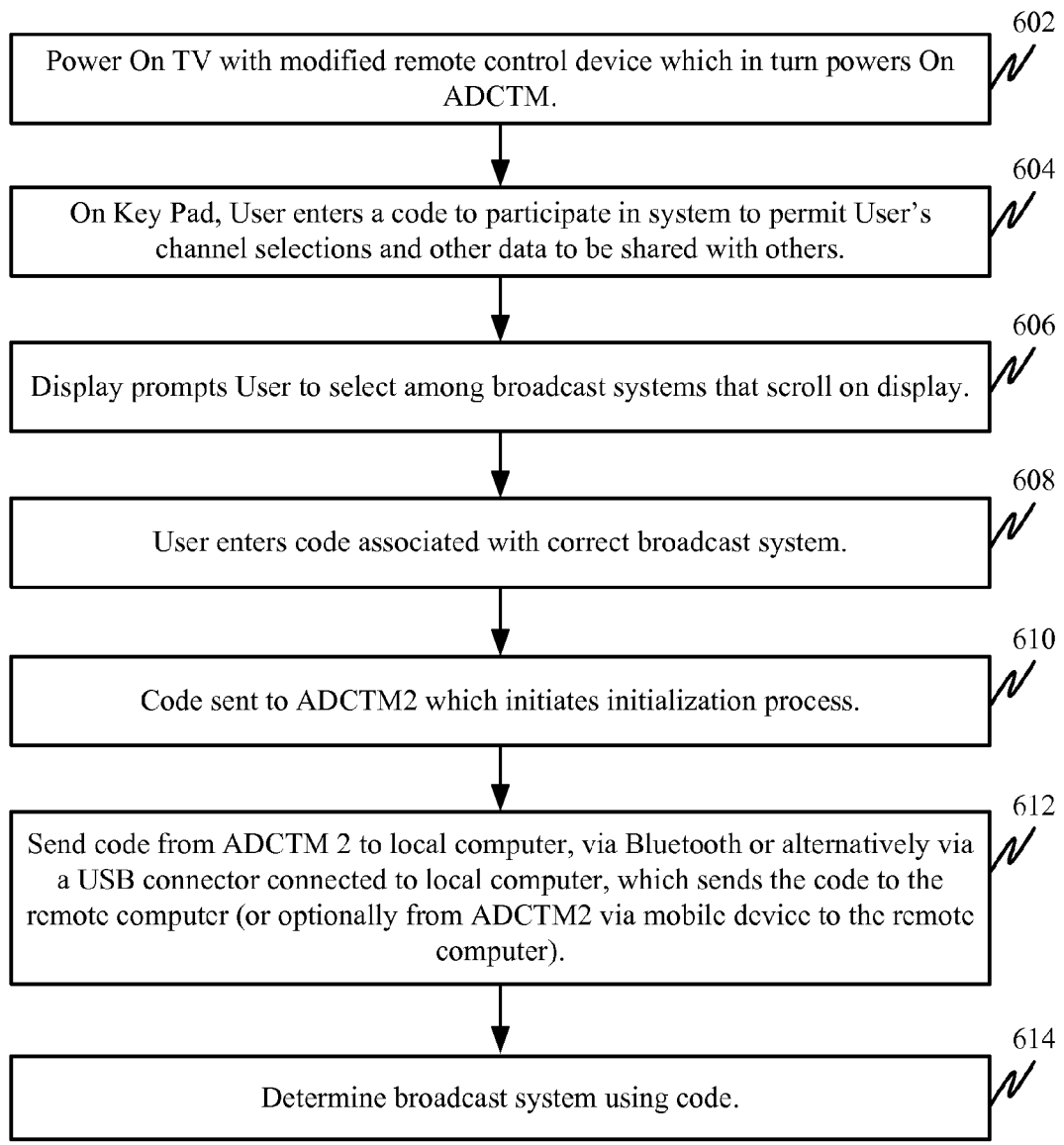
FIG. 6 is a flow diagram illustrating a method of initializing a viewing data collection system, according to one embodiment.

FIG. 6 is a flow diagram illustrating a method of system initialization of a viewing data collection system. Initially, a viewer may power/turn On a viewing device causing an Automatic Data Collection and Transfer Module (ADCTM) to turn On 602. The ADCTM may be a module built into the remote control device that tracks/collects User activity and transmits the activity/data to a local computer, via an output jack, or via a wireless connection, such as Bluetooth connection. The local computer may then transmit the data to a remote computer of the viewing data collection system. Alternatively, the data stored in the ADCTM may be transmitted wirelessly to the remote computer using a wireless/mobile device built into the remote control device, as described above. In one embodiment, the ADCTM may also assist the User in participating in various services the system offers, such as requesting information on products/services being advertised, order a product/service advertised or bid on a current product/service being auctioned on the television.

Upon turning on the viewing device having a viewing data collection system, the User may enter a code, using a key pad in the remote control device, to participate in the system and allow the User's collected data to be shared with others, such as advertisers and broadcasting stations 604. Participation may include, but is not limited to, collection of viewing data, requesting and receiving additional information on products and/or services in an advertisement, ordering a product and/or service identified in an advertisement, and bidding on a product and/or service in an auction. Once the code has been successfully entered, a display on the remote control device or viewing device may prompt the User to select the broadcast system being used, such as a cable television service provider, a radio frequency (RF) television service provider, or a satellite television service provider. The different types of broadcast system may scroll on the display for the User to select 606.

When the correct broadcast system is found, the User may enter a code associated with the broadcast system causing the system to recognize the selected broadcast system 608. The code may then be sent to an interface and data processor (ADCTM 2) in the ADCTM initiating the initialization process 610. From the interface and data processor (ADCTM 2), the code may be sent from the remote control device by direct connection or by Bluetooth to the local computer, which in turn communicates with the remote computer. In one embodiment, the code may be sent from the interface and data processor (ADCTM 2) to the remote computer via a mobile device or wireless device (hereinafter used interchangeably) 612. Using the code received, the remote computer may determine the broadcast system the User has 614. The code may act as a unique identifier, as described above, which may be used as an address location in a Library (see FIG. 1). Consequently, the remote computer will be able to determine which channel and hence which program the User is viewing.

Figure 7A:
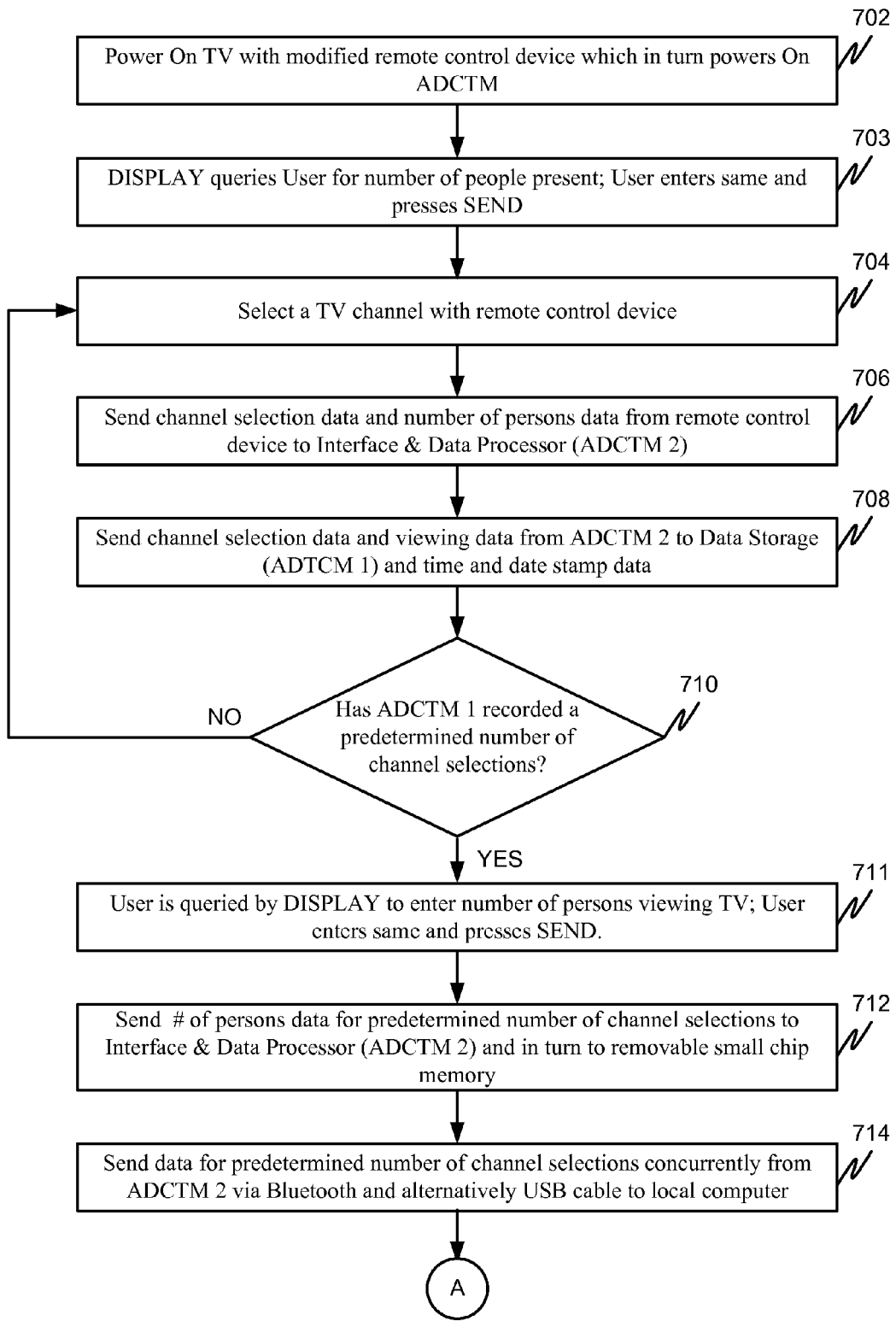
FIG. 7 (comprising FIGS. 7A and 7B) is a flow diagram illustrating a method for collecting viewing data from one or more viewing devices.
Figure 7B:
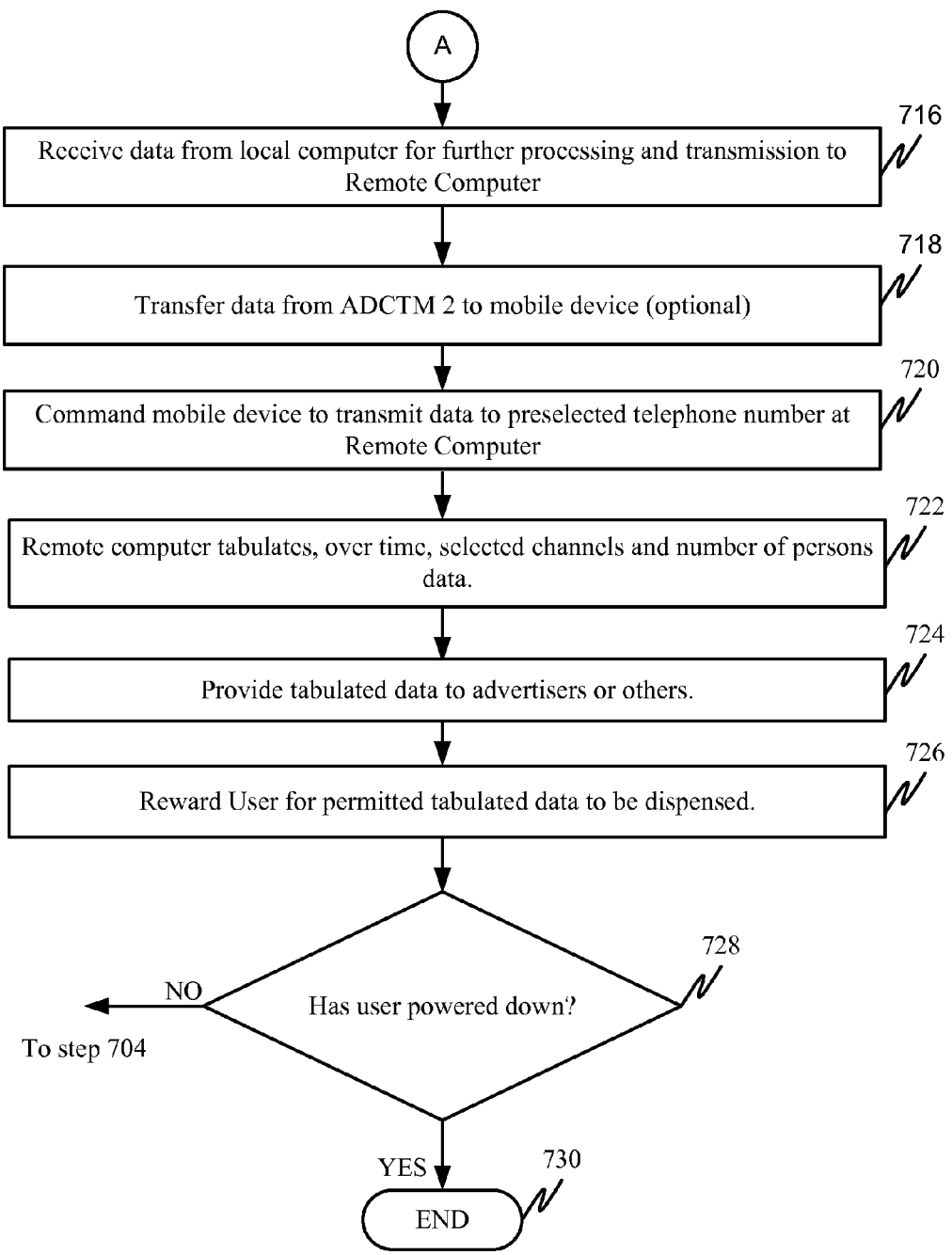

FIG. 7 (comprising FIGS. 7A and 7B) is a flow diagram illustrating a method for collecting viewing data from one or more viewing devices. Initially, a viewer may power/turn On a viewing device causing an Automatic Data Collection and Transfer Module (ADCTM) to turn On 702. As described above, the ADCTM may be a module built into the remote control device that tracks/collects User activity/data (as well as assist Users with system services) and transmits the data to a remote computer via a local computer or a mobile device.

After powering On, the User may be queried with a message, on a display of the remote control device or the television, to enter the number of persons currently watching the television. i.e. number of persons data. The user may enter the number of persons watching the television and then press a SEND button 703. A channel on the viewing device may then be selected using the remote control device 704. Upon selection of the channel, channel selection data or viewing data (hereinafter used interchangeably) and number of persons data may be sent from the remote control device to an Interface & Data Processor (ADCTM 2) in the ADCTM 706. From the Interface & Data Processor (ADCTM 2), the channel selection data and the viewing data may be time and date stamped and then sent to a data storage device (ADCTM 1) in the ADCTM 708. Next, the Interface & Data Processor (ADCTM 2) may determine whether a predetermined number of channel selections have been recorded in the data storage device (ADCTM 1) 710. The system may be programmed to collect or record a predetermined amount of channel selections prior to transmitting the collected data to the remote computer and/or request additional information from the User. The predetermined number of channel selections may be set by the system.

If a predetermined number of channel selections have not been recorded, the data storage device (ADCTM 1) may continue to collect or record channel selection data 704. However, if a predetermined number of channel selections have been recorded, the User may be queried with a message, on a display of the remote control device or the television, to again enter the number of persons currently watching the television to determine if the number watching the television has changed. The user may enter the number of persons watching the television and then press the SEND button 711. Upon selection of the SEND button, the number of persons data for the predetermined number of channel selections collected may be sent to Interface & Data Processor (ADCTM 2) and in turn to a removable small non-volatile memory chip 712. In one embodiment, where it would be desirable to forego communicating via Bluetooth/cable/local computer to the remote computer, data sent to the removable small non-volatile memory chip may be delivered by removing the chip and delivering it physically to the remote computer, or simply inserting the chip into the local computer for data delivery to the remote computer.

Next, the channel selection data (as well as the number of persons data) may be sent concurrently from the Interface & Data Processor (ADCTM 2) via Bluetooth, or alternatively via a USB connector, to the local computer 714. Upon receipt of the channel selection data, the local computer may then send the channel selection data and number of persons data to the remote computer for tabulation 716. Optionally, the channel selection data may be sent from the Interface & Data Processor (ADCTM 2) to a mobile device embedded in the remote control device 718 which may then send the channel selection data (and number of persons data) to a preselected telephone number at the remote computer 720. The remote computer may then tabulate, over time, the channels selected (as well as the number of persons watching) by all Users of the system 722. The tabulated data (or results) may then be provided to advertisers, broadcast stations, groups, etc. The User may then be rewarded for permitting the tabulated data (or results) to be dispensed or released 726.

The system may then check to see if the User has turned off the system or powered down the television 728. If the system or television has not been powered down, the system may monitor for the selection of another TV channel via the remote control device 704 and the process is repeated. However, if the system or television has powered down 728, the collection of channel selection data (or viewing data) and number of persons data may terminate 730.

Figure 8A:
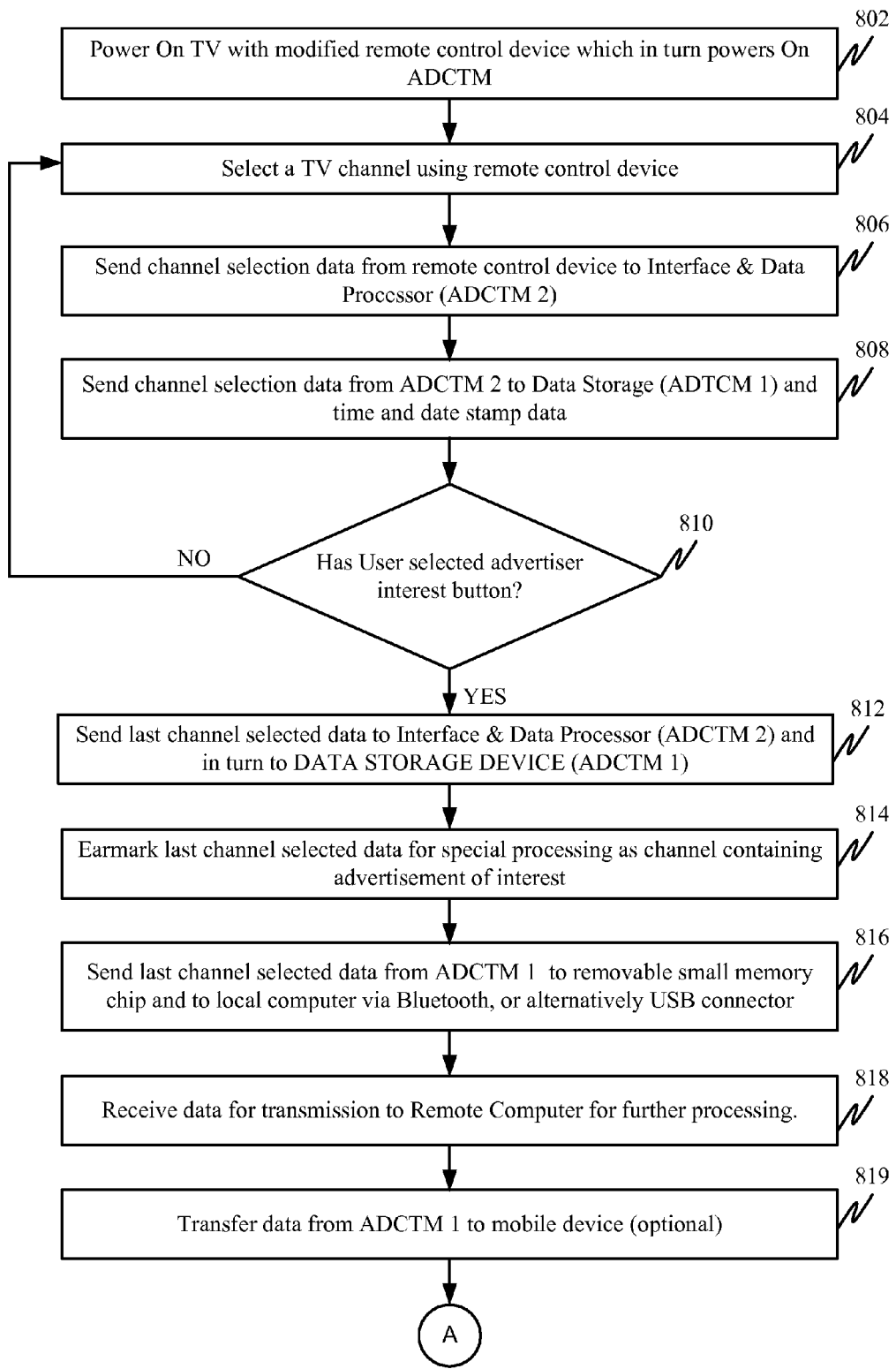
FIG. 8 (comprising FIGS. 8A-8C) is a flow diagram illustrating a method for interacting with advertisements on a viewing device having a viewing data collection system.
Figure 8B:
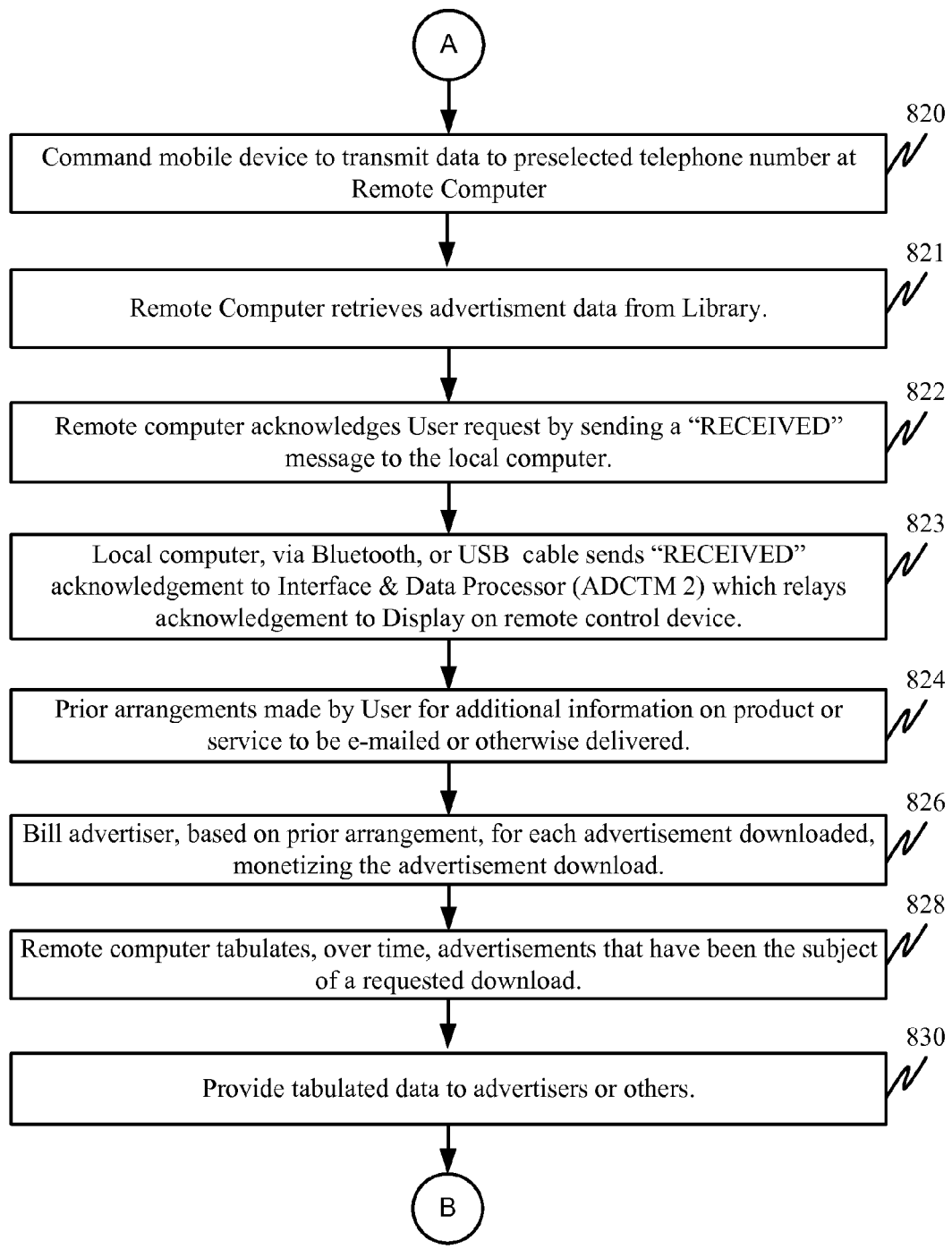
Figure 8C:
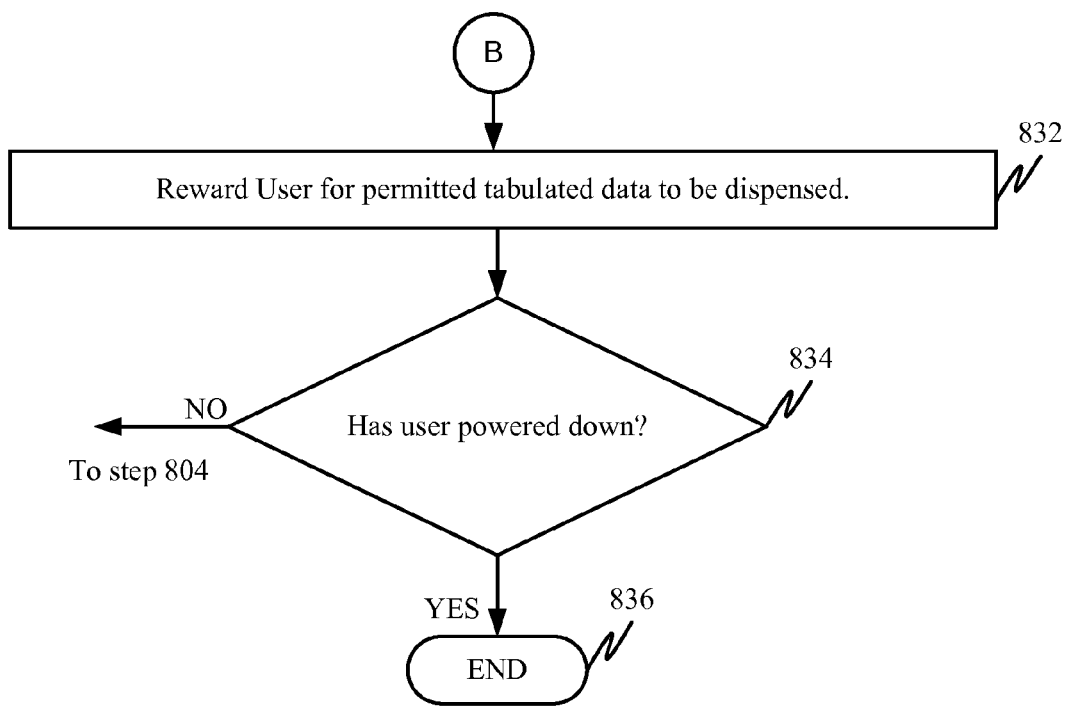

FIG. 8 (comprising FIGS. 8A-8C) is a flow diagram illustrating a method for a method for interacting with advertisements on a viewing device having a viewing data collection system. Initially, a viewer may power/turn On a viewing device causing an Automatic Data Collection and Transfer Module (ADCTM) to turn On 802. As described above, the ADCTM may be a module built into the remote control device that tracks/collects User activity/data (as well as assist Users with system services) and transmits the data to a remote computer via a local computer or a mobile device.

A channel on the viewing device may then be selected using the remote control device 804. Upon selection of the channel, channel selection data may be sent from the remote control device to an Interface & Data Processor (ADCTM 2) in the ADCTM 806. From the Interface & Data Processor (ADCTM 2), the channel selection data may be time and date stamped and then sent to a data storage device (ADCTM 1) in the ADCTM 808. Next, the Interface & Data Processor (ADCTM 2) may then determine whether a User has selected an Advertiser Interest button 810. As described above with reference to FIG. 5, if a User views an advertisement in which he would like additional information about the product and/or service being advertised, the User may select the Advertiser Interest button on the remote control device.

If the User has not selected the Advertiser Interest button, the data storage device (ADCTM 1) may continue to record channel selection data from the remote control device 804. However, if the User has selected the Advertiser Interest button, the last channel selected (i.e. last channel selection data) may be sent to the Interface & Data Processor (ADCTM 2) 812 and in turn to the data storage device (ADCTM 1). The last channel selected data may be earmarked for special processing as the channel containing the advertisement of interest 814. The last channel selected data may then be sent from the data storage device (ADCTM 1) in the remote control device to a local computer via a wireless connection, such as Bluetooth, or a USB cable 816. Upon receipt of the last channel selection data, the local computer may then send the data to the remote computer for tabulation 818.

Optionally, the last channel selection data may be sent from the data storage device (ADCTM 1) to a mobile device embedded in the remote control device 819 which may then send the last channel selection data to a preselected telephone number at the remote computer 820. The remote computer may then us the last channel selection data to retrieve the correct advertisement data, and thus the correct product and/or service, from the Library 821. The remote computer may acknowledge the User request by sending a "RECEIVED" message, as well as the advertisement data, to the local computer 822. Next, the local computer may send the "RECEIVED" acknowledgement, as well as the advertisement data, to the Interface & Data Processor (ADCTM 2) of the remote control device, wired or wirelessly, which may then relay the acknowledgement to the display on the remote control device or to the television 823. Prior arrangements made by the User for additional information on products and/or services (i.e. advertisement data) contained in the advertisement for sending to the User 824. The information may be sent via electronic mail, facsimile, regular mail, or any other known method of delivery.

The system may then bill the advertiser for each time its advertisement was downloaded, thus monetizing the advertisement download. A billing arrangement between the advertiser and the system may be prearranged 826. The remote computer may tabulate, over time, the advertisements that have been the subject of a requested download 828. The tabulated data (or results) may then be provided to, and used by, broadcasting stations to set advertising fees, advertisers 830 to determine the products and/or services consumers are interested in, etc. The User may then be rewarded for permitting the tabulated data (or results) to be dispensed or released 832.

The system may then check to see if the User has turned off the system of powered down the television 834. If the system or television has not been powered down, the system may monitor for the selection of another TV channel via the remote control device 804 and the process is repeated. However, if the system or television has powered down 834, the monitoring of requests for additional information on advertisements may terminate 836.

Figure 9A:
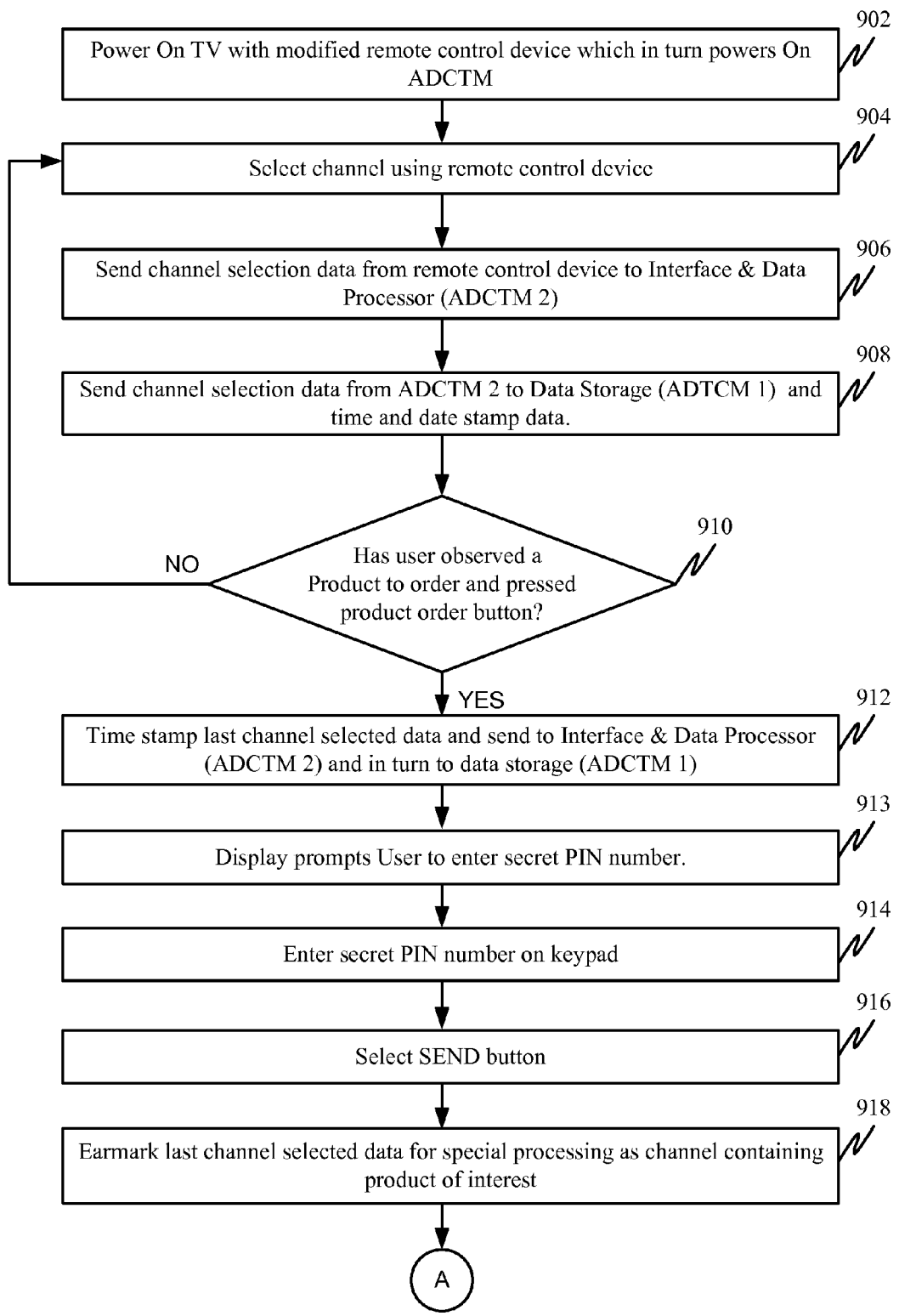
FIG. 9 (comprising FIGS. 9A-9C) is a flow diagram illustrating a method for ordering a product or service on a viewing device having a viewing data collection system.
Figure 9B:
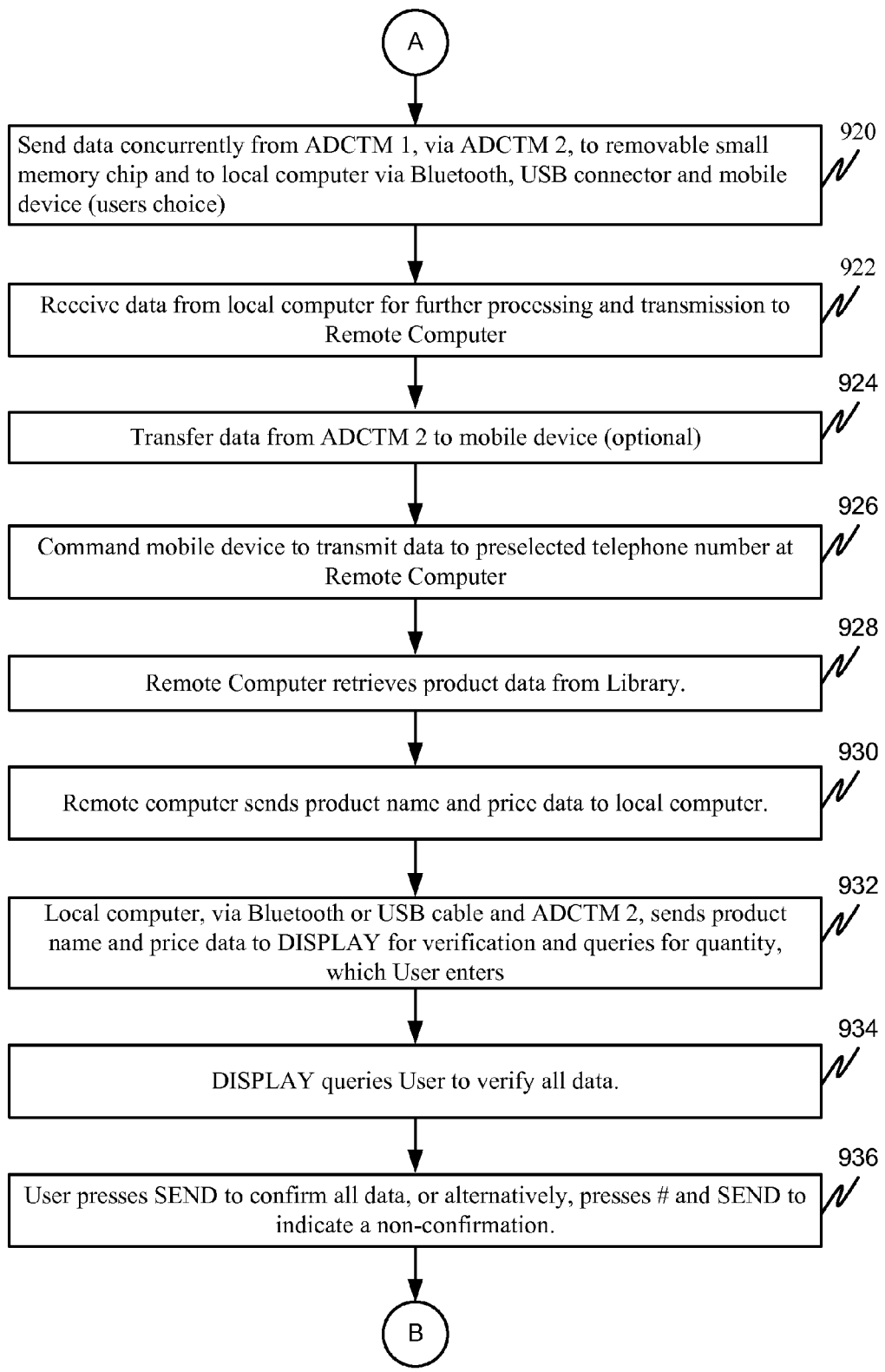
Figure 9C:
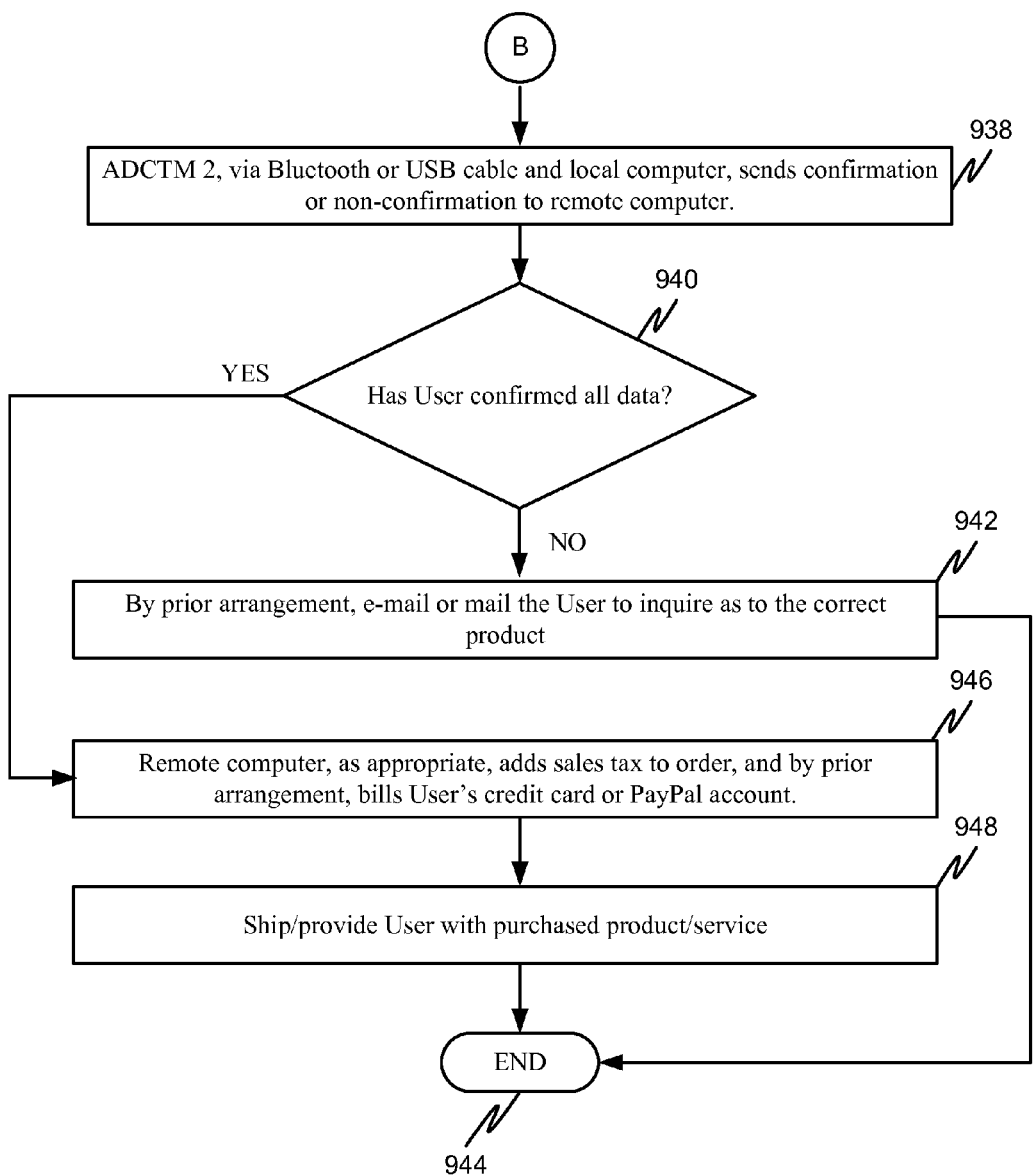
Figure 10A:
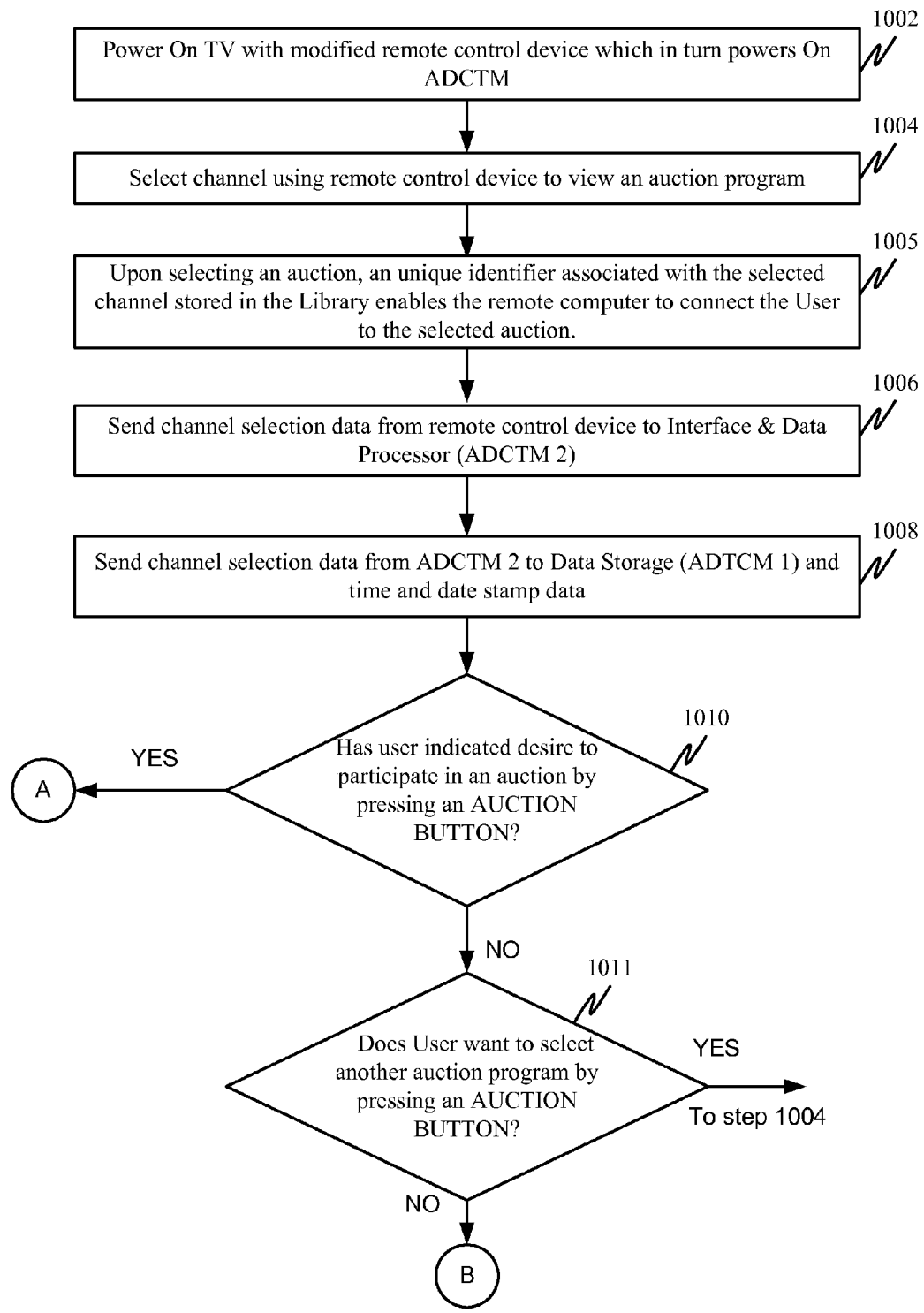
FIG. 10 (comprising FIGS. 10A-10E) is a flow diagram illustrating a method for participating in an auction using a viewing device having a viewing data collection system.
Figure 10B:
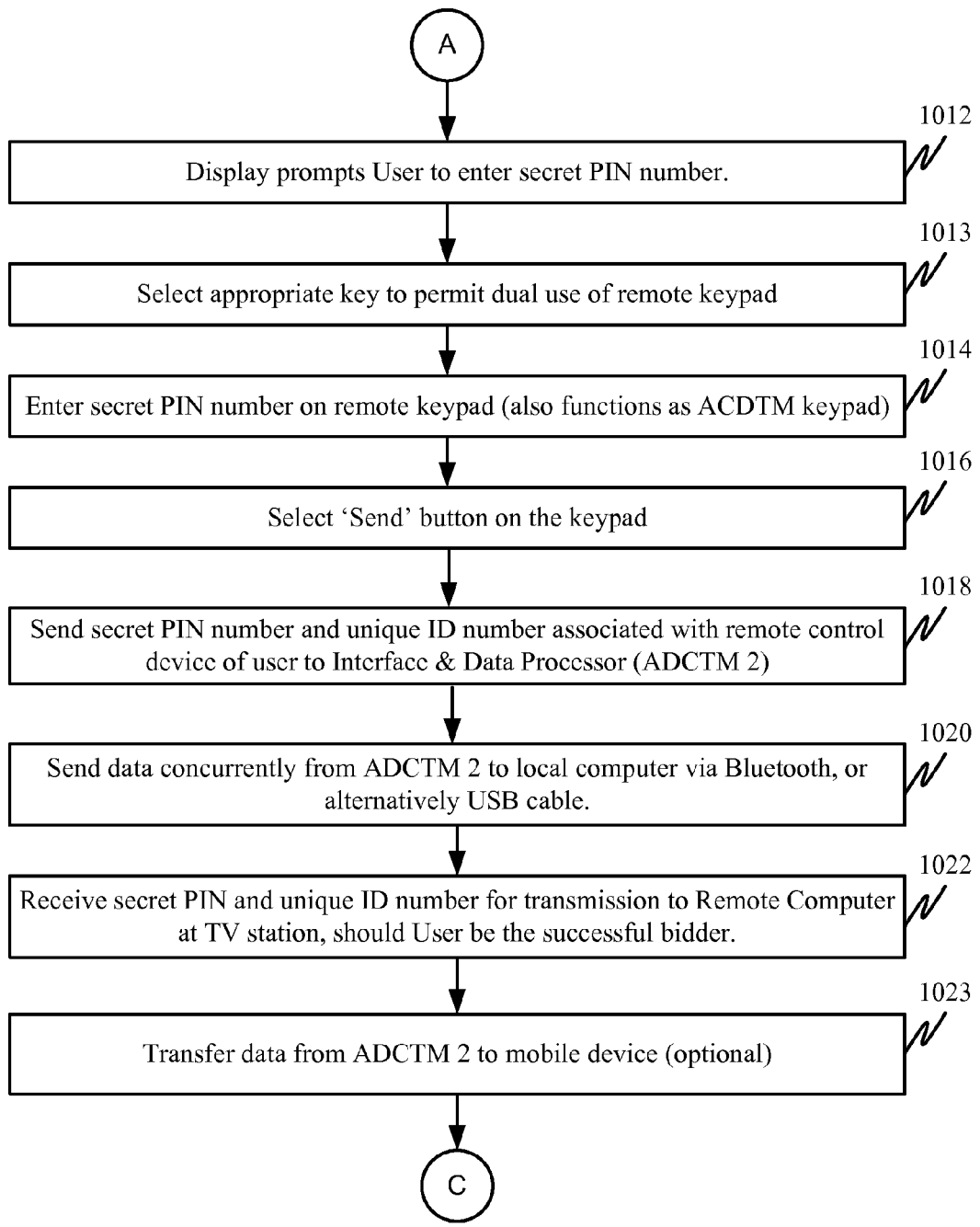
Figure 10C:
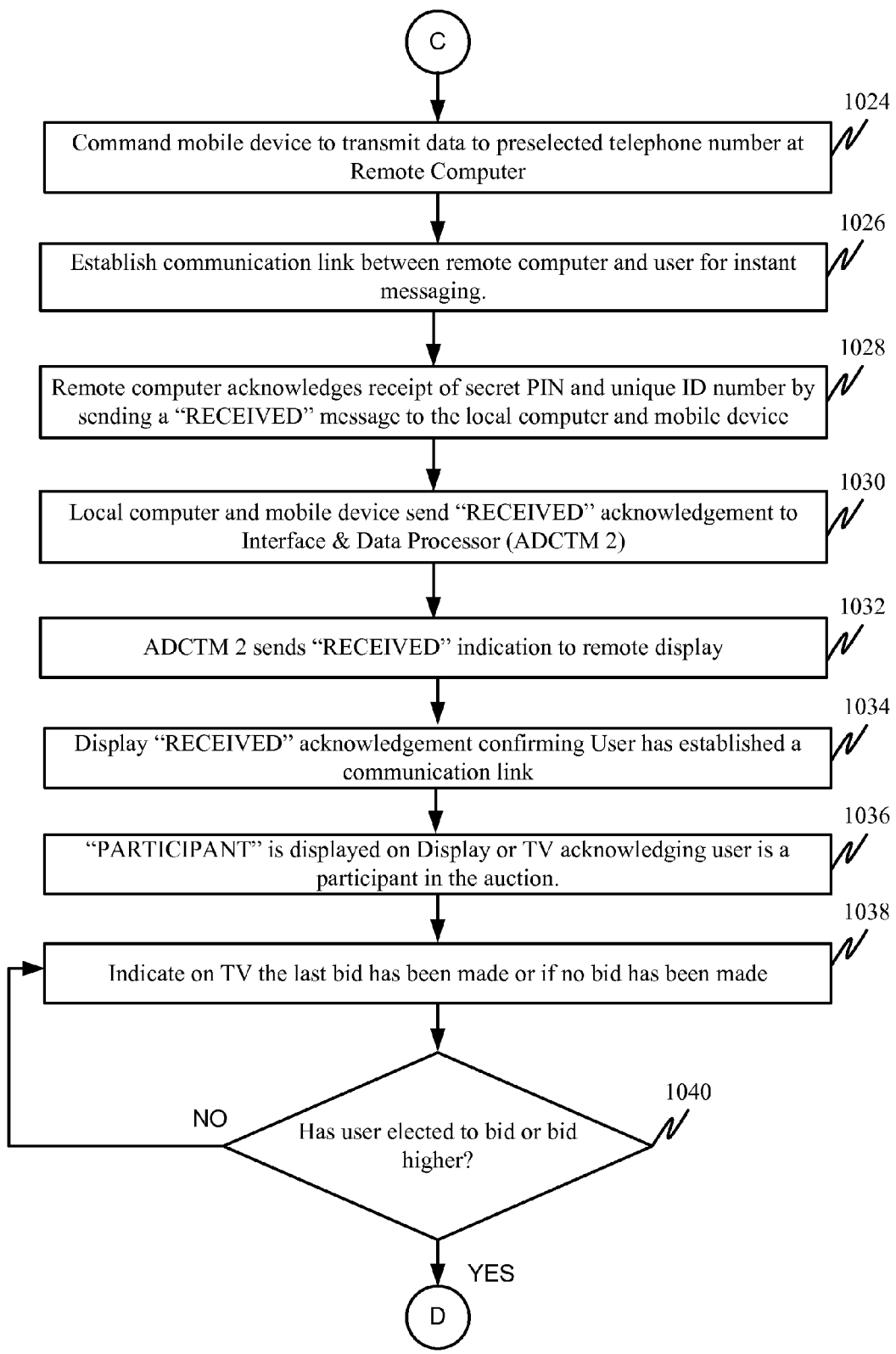
Figure 10D:
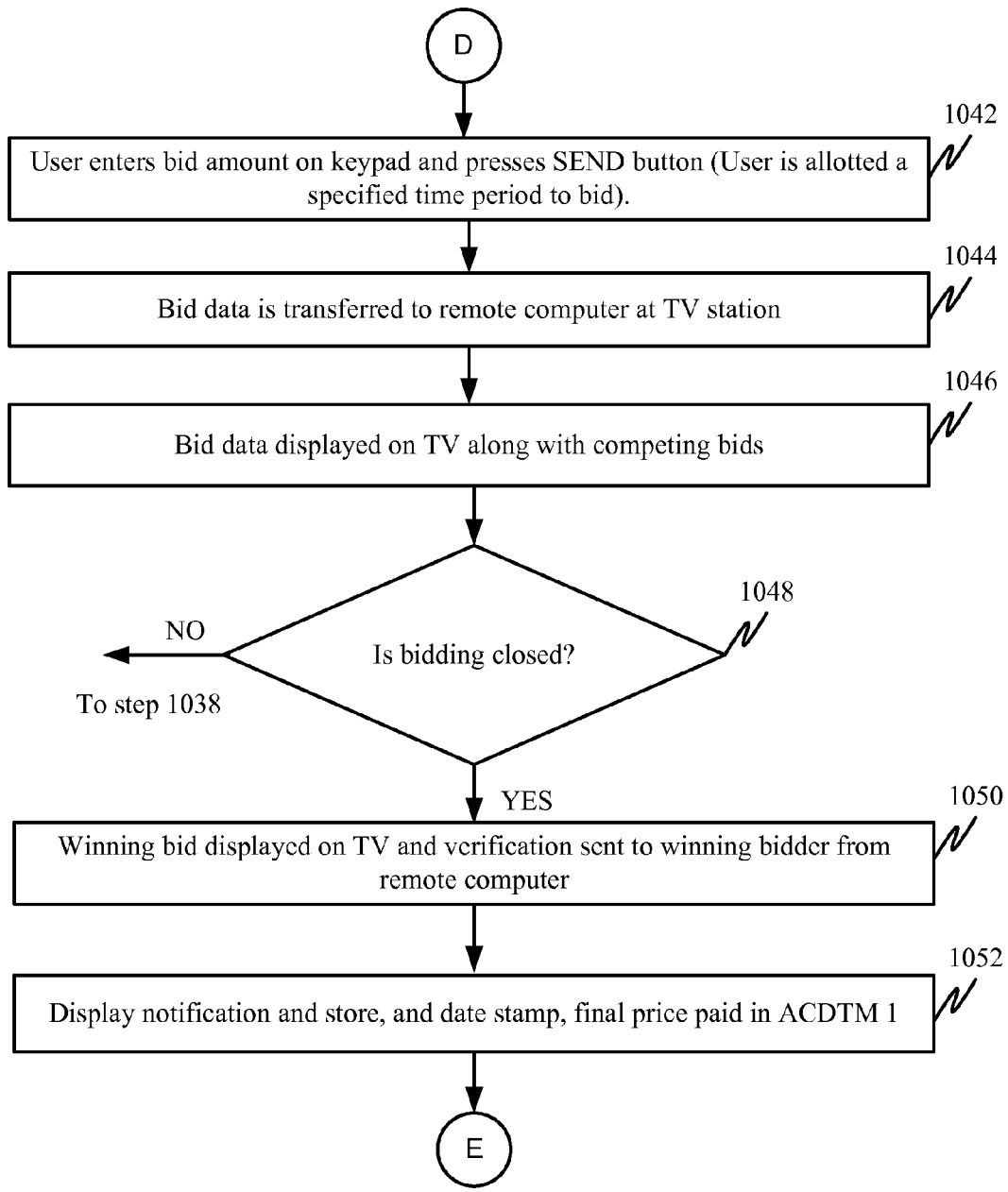
Figure 10E:
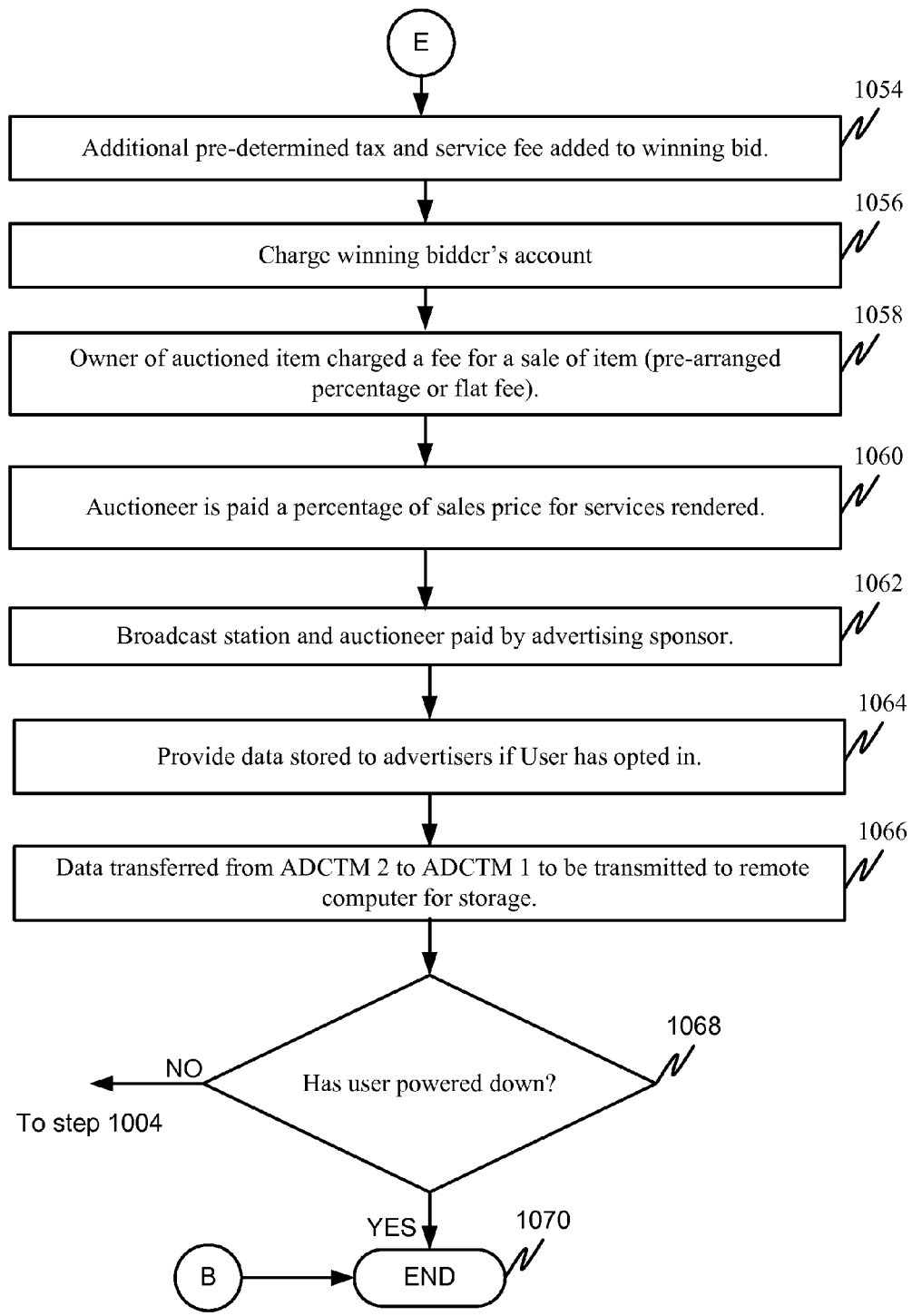

FIG. 9 (comprising FIGS. 9A-9C) is a flow diagram illustrating a method for ordering a product or service on a viewing device having a viewing data collection system. Initially, a viewer may power/turn On a viewing device causing an Automatic Data Collection and Transfer Module (ADCTM) to turn On 902. As described above, the ADCTM may be a module built into the remote control device that tracks/collects User activity/data (as well as assist Users with system services) and transmits the data to a remote computer via a local computer or a mobile device.

A channel on the viewing device may then be selected using the remote control device 904. Upon selection of the channel, channel selection data may be sent from the remote control device to an Interface & Data Processor (ADCTM 2) in the ADCTM 906. From the Interface & Data Processor (ADCTM 2), the channel selection data may be time and date stamped and then sent to a data storage device (ADCTM 1) in the ADCTM 908. Next, the Interface & Data Processor (ADCTM 2) may then determine whether a User has selected a Product Order button 910. As described above with reference to FIG. 5, if a User views a product and/or service that he would like to purchase or order, the User may select the Product Order button on the remote control device.

If the User has not selected the Product Order button, the data storage device (ADCTM 1) may continue to record channel selection data from the remote control device 904. However, if the User has selected the Product Order button, the last channel selected (i.e. last channel selection data) may be sent to the Interface & Data Processor (ADCTM 2) 912. The User may then be prompted on a display of the remote control device or on the viewing device (or television) to enter a secret PIN number 913. By entering a secret PIN number, the system may confirm it is the User requesting to order the product and/or service and not another trying to illegally access the User's account. If the User is still interested in purchasing the product and/or service, the User may enter the secret PIN number using the keypad on the remote control device 914 and select a "SEND" button 916. Next, the last channel selected data may be earmarked for special processing as the channel containing the product and/or service of interest 918.

The last channel selected data may then be sent from the Interface & Data Processor (ADCTM 2) in the remote control device to a removable small non-volatile memory chip and to a local computer via a wireless connection, such as Bluetooth, a USB cable or mobile device (User's choice) 920. Upon receipt of the last channel selection data, the local computer may then send the data to the remote computer for tabulation 922.

Optionally, the last channel selection data may be sent from the Interface & Data Processor (ADCTM 2) to a mobile device embedded in the remote control device 924 which may then send the channel selection data to a preselected telephone number at the remote computer 926. Next, the remote computer may retrieve the product advertisement from the Library (see FIG. 1). The Library may store a list of all programs that are being broadcast. For example, the list may comprise all broadcasts starting at 12:01 AM and running all day through to the next evening until midnight. Consequently, the Library contains the exact timing of all advertisements. By knowing the time the advertisement was aired, the channel the User is watching and the service provider as ascertained in the Initialization process of FIG. 6 (as each service provider assigns different channels to the same broadcasting station), the remote computer is able to retrieve the correct advertisement, and thus the correct product and/or service, from the Library 928. Once the information has been retrieved, the remote computer may send the product name, as well as the price, to the local computer 930.

Next, the local computer, via a wireless connection, such as Bluetooth, and the Interface & Data Processor (ADCTM 2), may send the product name and price data to the display on the remote control device or television for verification by the User and indication of the quantity to order 932. The product name and price may then be displayed along with a request for the User to verify the data 934.

As described above, when the User presses the Product Order button, the last channel data is recorded and time and date stamped. Using the time stamp, the exact advertisement may be looked up in the Library. However, by the time the User selects the Product Order button, a different advertisement may be being broadcast. For example, an advertisement for a widget may be aired at 3:30 pm sharp and run for 30 seconds, however, the User may not select the Product Order button until 3:31 pm and the wrong advertisement will be retrieved from the Library. Without verification, the User would purchase and receive a product and/or service he did not want.

Upon receiving the request for verification, the User may select the SEND Button to confirm all data is correct, or alternatively, the User may press the pound key (#) and then the SEND button to indicate a non-confirmation, i.e. the User does not want the product being displayed 936. Next, the Interface & Data Processor (ADCTM 2) may send confirmation or non-confirmation to the remote computer via the local computer or mobile device embedded in the remote control device 938.

The remote computer may then determine if the User has confirmed all the data 940. If a non-confirmation is received, an inquiry may be sent to the User to inquire as to the correct product and/or service. The method of inquiry may be prearranged and may include via electronic mail, facsimile, regular mail, or any other known method of delivery 942. After the inquiry is sent, the product ordering may end and normal television viewing my resume 944. However, it the User replies with a confirmation, the remote computer, as appropriate, may add sales tax to the order. Additionally, by prior arrangement with the User, the User's credit card or PayPal account may be billed 946. After payment has been confirmed, the User may be shipped or provided the product and/or service purchased 948 and the product ordering may end and normal television viewing my resume 944.

FIG. 10 (comprising FIGS. 10A-10E) is a flow diagram illustrating a method for participating in an auction using a viewing device having a viewing data collection system. Initially, a viewer may power/turn On a viewing device causing an Automatic Data Collection and Transfer Module (ADCTM) to turn On 1002. As described above, the ADCTM may be a module built into the remote control device that tracks/collects User activity/data (as well as assist Users with system services) and transmits the data to a remote computer via a local computer or a mobile device.

A channel on the viewing device may then be selected using the remote control device to view an auction program 1004. A Library (see FIG. 1) may include a list of all auction programs offered, on all channels chronologically by time of day, to the User, along with an address location, or path, to which the remote computer, via the Internet, or other medium, may direct the User's selection. Each auction is associated with a unique identifier and by selecting a particular auction, the remote computer may link the User in direct communication with the selected auction so that it is visible on the User's viewing device 1005.

Upon selection of the channel, channel selection data may be sent from the remote control device to an Interface & Data Processor (ADCTM 2) in the ADCTM 1006. From the Interface & Data Processor (ADCTM 2), the channel selection data may be time and date stamped and then sent to a data storage device (ADCTM 1) in the ADCTM 1008. Next, the Interface & Data Processor (ADCTM 2) may then determine whether a User has selected an Auction button indicting a desire to participate in an auction 1010. As described above with reference to FIG. 5, if a User wants to bid on a product and/or service being auctioned off, the User may select the Auction button on the remote control device. If the User has not selected the Auction button, an inquiry may be made to the User to select a different auction program by selecting the Auction button 1011. If the User still does not wish to participate in an auction program, the auction services may end 1070. If the User does want to participate in another auction program, a channel on the viewing device may then be selected using the remote control device to view an auction program 1004 and the process may be repeated.

If, however, it has been determined that the User would like to participate in an auction program, the User may then be prompted on a display of the viewing device to enter a secret PIN number 1012. By entering a secret PIN number, the system may confirm it is the User requesting to participate in an auction and not another trying to illegally access the User's account. Once the secret PIN number has been requested, the User may select the appropriate key to permit dual use of the keypad 1013. That is, the keypad may be used for changing channels and for participating in the auction. The User may then enter the secret PIN number using the keypad on the remote control device 1014 and select a "SEND" button 1016. Next, the secret PIN number and unique ID number associated with the remote control device of the User may be sent to the Interface & Data Processor (ADCTM 2) 1018.

Next, the secret PIN number and the unique identification number may be concurrently sent from the Interface & Data Processor (ADCTM 2) in the remote control device to a local computer, via a wireless connection, such as Bluetooth, or a USB cable 1020. The secret PIN number and the unique identification number may be received by the local computer for transmission to the remote computer at the broadcast station 1022 to process User's account should he/she be the successful bidder.

Optionally, the secret PIN number and the unique identification number may be sent from the Interface & Data Processor (ADCTM 2) to a mobile device embedded in the remote control device 1023 which may then send the channel selection data to a preselected telephone number at the remote computer 1024. Upon transmitting the data, a communication link may be established between the remote computer and the mobile device embedded in the remote control device for instant messaging 1026. The remote computer may acknowledge receipt of the secret PIN number and the unique identification (ID) number by sending a "RECEIVED" message to the local computer and mobile device 1028. Next, the local computer and mobile device may send the "RECEIVED" acknowledgement to the Interface & Data Processor (ADCTM 2), wired or wirelessly, 1030 which may then relay the acknowledgement to the display on the remote control device or television 1032. The display (or television) may then display the "RECEIVED" acknowledgement confirming that the User has established a communication link 1034. The display (or television) may then display "PARTICIPANT" acknowledging that the User is a participant in the auction 1036.

Next, the viewing device may indicate what the last bid to be placed was or if there have not been any bids 1038. Based on the information displayed, the User may elect to place a bid, or bid higher, on a product or service being auctioned 1040. If the User has not elected to bid, the viewing device may continue to display/indicate the last bid made or if there have not been any bids 1038. If the User has elected to bid, the User may enter a bid amount using the keypad on the remote control device and press SEND. The system may allocate a specified time in which to bid 1042. Once entered, the bid data may then be transferred to the remote computer 1044.

The bid data entered by the User may also be displayed on the viewing device along with competing bids 1046. Once the User's bid has been accepted, the system may determine if bidding for the auction has been closed 1048. If bidding has not been closed, the User may monitor the viewing device for new bids 1038 and may elect to bid higher 1040. If bidding has been closed, the winning bid may be displayed on the viewing device and verification sent to the winning bidder from the remote computer 1050. Next, the notification is displayed on the viewing device and/or remote control device and is date stamped and stored in a data storage device (ADCTM 1) in the ADCTM along with the final bidding price 1052.

An additional pre-determined tax and service fee may be added to the winning bid 1054 and the winning bidder's account may be charged 1056. Furthermore, the owner of the item being auctioned may be charged a fee for the sale of the item, either a pre-arranged percentage or a flat fee 1058. The Auctioneer may be paid a percentage of the sales price (i.e. winning bid), or flat fee, for services rendered 1060. The broadcast station and auctioneer may also receive compensation from advertising sponsors 1062. The compiled data may then be provided to advertisers if the User has opted in to the system 1064. The data may then be transferred from the Data Storage Device (ADCTM 1) to the Interface and Data Processor (ADCTM 2) for transmission to the remote computer for storage 1066.

The system may then check to see if the User has turned off the system or powered down the television 1068. If the system or television has not been powered down, the system may monitor for the selection of another TV channel via the remote control device 1004 and the process is repeated. However, if the system or television has powered down 1068, User's participation in the auction program may terminate 1070.

Although the system described above is directed to a public auction, the system may also be utilized for specialized or closed auctions for industrial goods, agricultural goods and the like or in the import/export market that would complement membership organizations such as Alibaba®.

Figure 11A:
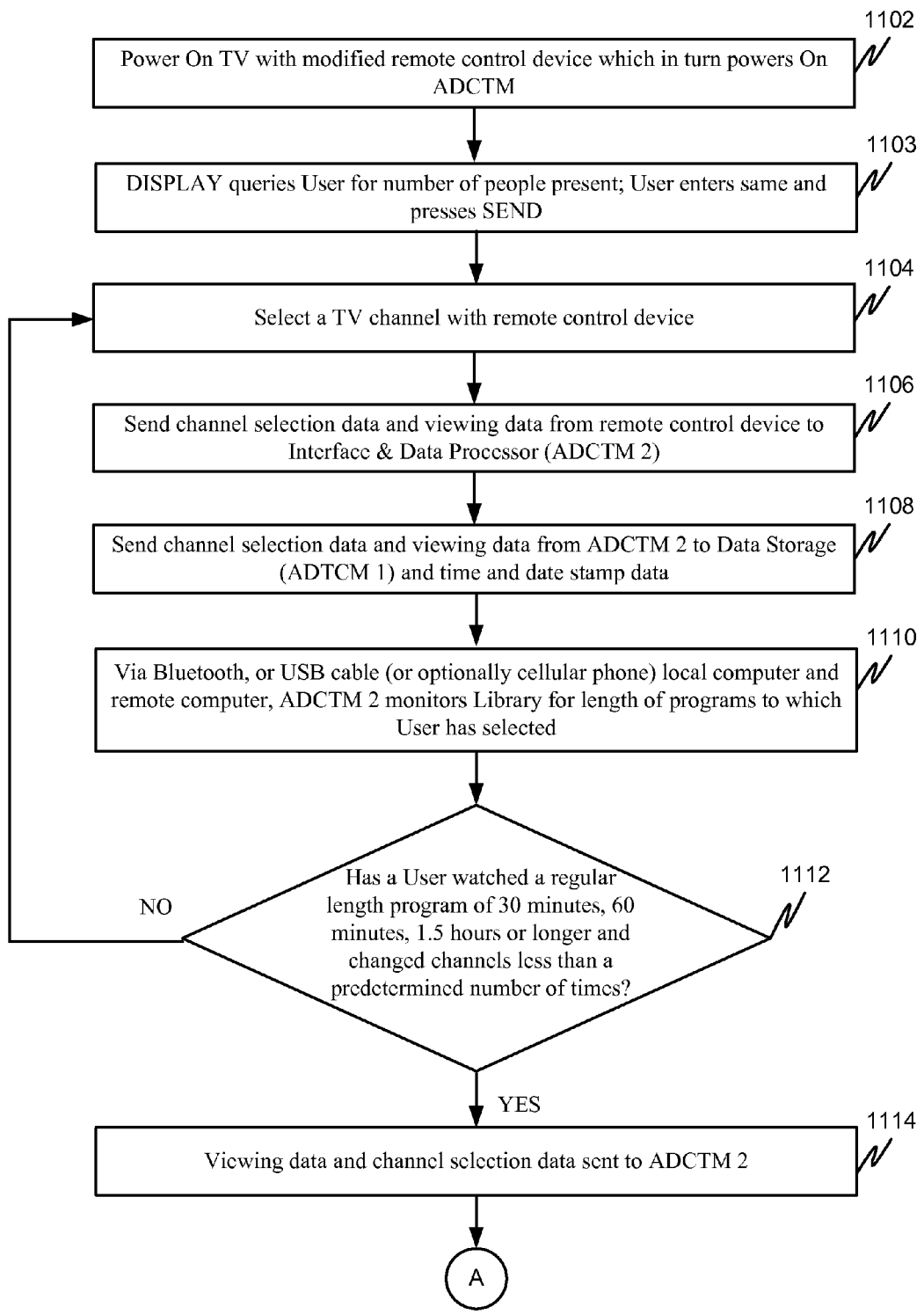
FIG. 11 (comprising FIGS. 11A-11C) is a flow diagram illustrating a method for rating a television broadcast or program on a viewing device having a viewing data collection system.
Figure 11B:
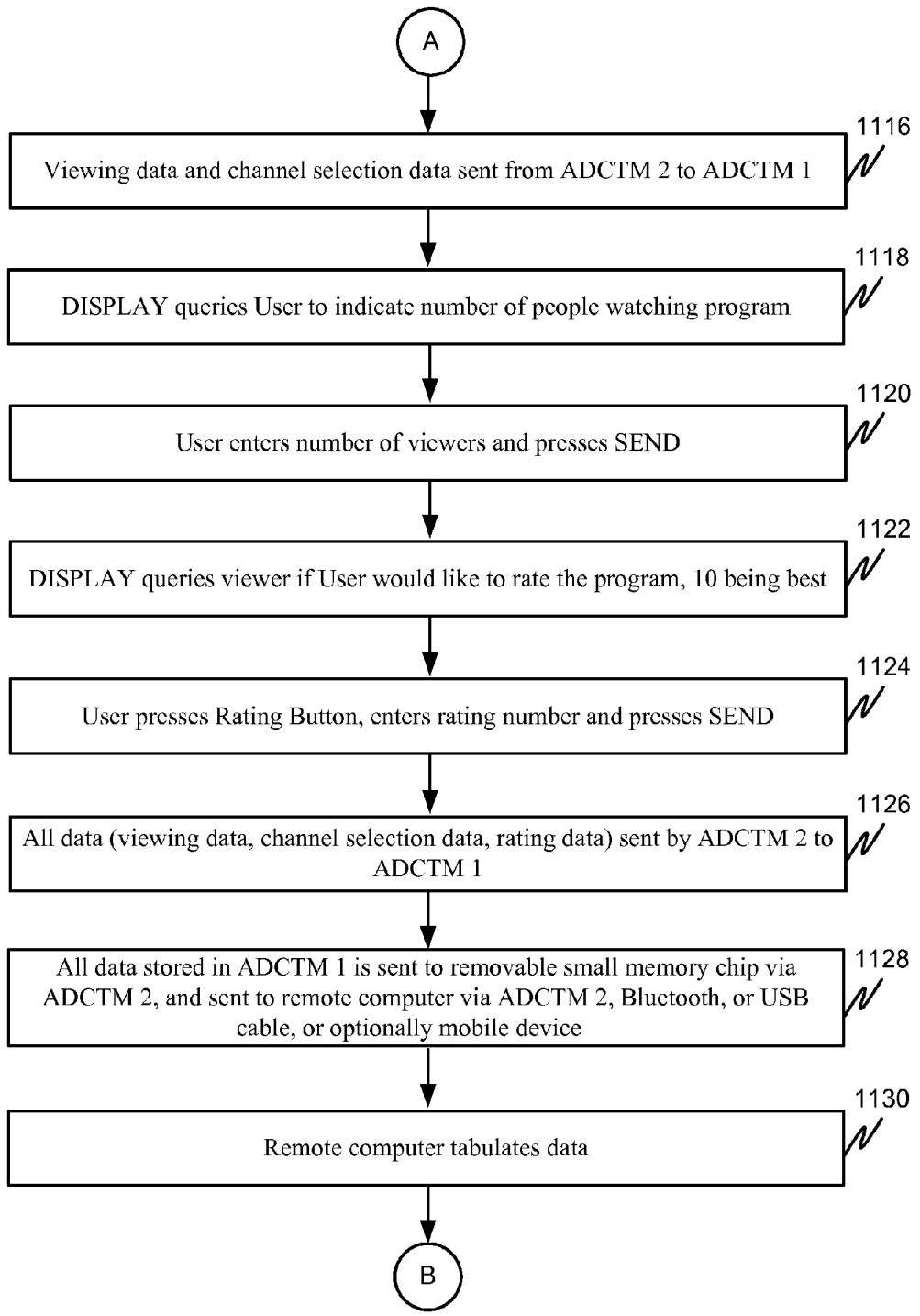
Figure 11C:
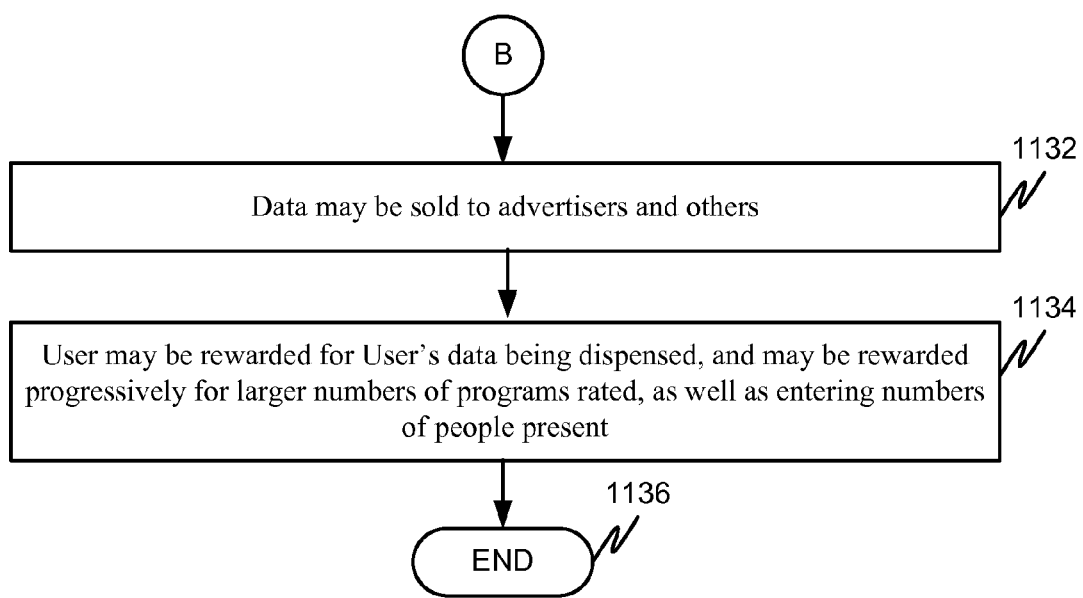

FIG. 11 (comprising FIGS. 11A-11C) is a flow diagram illustrating a method for rating a television broadcast or program on a viewing device having a viewing data collection system. Initially, a viewer may power/turn On a viewing device causing an Automatic Data Collection and Transfer Module (ADCTM) to turn On 1102. As described above, the ADCTM may be a module built into the remote control device that tracks/collects User activity/data (as well as assist Users with system services) and transmits the data to a remote computer via a local computer or a mobile device.

After powering On, the User may be queried with a message, on a display of the remote control device, to enter the number of persons currently watching the television, i.e. number of persons data. The User may enter the number of persons watching the television and then press a SEND button 1103. A channel on the viewing device may then be selected using the remote control device 1104. Upon selection of the channel, channel selection data and number of persons data may be sent from the remote control device to an Interface & Data Processor (ADCTM 2) in the ADCTM 1106. From the Interface & Data Processor (ADCTM 2), the channel selection data and the number of persons data may be time and date stamped and then sent to a data storage device (ADCTM 1) in the ADCTM 1108.

The interface and data processor (ADCTM 2), via the remote computer and/or local computer, may monitor the Library for the length of the programs to which the User has selected. The Library may be monitored through the remote computer via a Bluetooth connection to the local computer which is in communication with the remote computer, via a USB cable to the local computer which is in communication with the remote computer and/or a mobile device embedded in the remote control device which may directly communicate with the remote computer 1110. Next, it may be determined if the User watched a regular length program of thirty (30) minutes, sixty (60) minutes, an hour and a half (1.5) or longer and if the channel was changed less than a pre-determined number of times, for example four (4) times 1112. If the User has not watched a program of a regular length and has changed channels less than four (4) times 1112, another channel on the viewing device may then be selected using the remote control device 1104.

If the User has watched a program of a regular length and has changed channels less than a pre-determined number of times 1112, the viewing data and channel selection data may be sent to interface and data processor (ADCTM 2) 1114. The number of persons data and channel selection data may then be sent from the interface and data processor (ADCTM 2) to data and storage device (ADCTM 1) for storage 1116.

Next, the User may be queried with a message, on a display of the remote control device or a television, to enter the number of persons currently watching the television. i.e. number of persons data 1118. The User may then enter the number of persons watching the television and then press a SEND button 1120. The User may then be queried with a message, on a display of the remote control device or a television, if he would like to rate the program being watched 1112. To rate the program, the User may select or press the Rating Button (see FIG. 5), enter the rating and press the SEND button 1124. In one embodiment, the rating system may be on a scale of 1-10 with 10 being best.

All data may then be sent by the interface and data processor (ADCTM 2) to data and storage device (ADCTM 1) 1126. All data stored in the data and storage device (ADCTM 1) may be sent to a removable small non-volatile memory chip via the interface and data processor (ADCTM 2) and sent to the remote computer via a Bluetooth connection to the local computer which is in communication to the remote computer, via a USB cable to the local computer which is in communication with the remote computer and/or a mobile device embedded in the remote control device which may directly communicate with the remote computer 1128.

The remote computer may then tabulate, over time, the ratings data by all Users of the system 1130. The tabulated data (or results) may then be provided or sold to advertisers, broadcast stations, groups, etc. 1132. The User may then be rewarded for permitting the tabulated data (or results) to be dispensed or released 1134 and the ratings program may end 1136. In one embodiment, the User may be rewarded progressively for, including but not limited to, the number of programs rated, not skipping viewing data, or entering the number of people present.

One or more of the components, steps, and/or functions illustrated in FIGS. 1, 2, 3, 4, 5, 6, 7, 8, 9, 10 and/or 11 may be rearranged and/or combined into a single component, step, or function or embodied in several components, steps, or functions without affecting the operation of the communication device having channel-specific signal insertion. Additional elements, components, steps, and/or functions may also be added without departing from the invention. The apparatus, devices, and/or components illustrated in FIGS. 1, 2, 3, 4 and/or 5 may be configured to perform one or more of the methods, features, or steps described in FIGS. 6, 7, 8, 9, 10 and/or 11. The novel algorithms described herein may be efficiently implemented in software and/or embedded hardware.

Those of skill in the art would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system.

While certain exemplary embodiments have been described and shown in the accompanying drawings, it is to be understood that such embodiments are merely illustrative of and not restrictive on the broad application, and that this application is not be limited to the specific constructions and arrangements shown and described, since various other modifications may occur to those ordinarily skilled in the art.

The invention claimed is:

1. A method for participating in auctions using a viewing device, comprising:
- selecting a channel from a list of channels using a remote control device having a unique identification number, each channel in the list of channels associated with a different auction and the selection of the channel determines an auction to view;
- recording the channel selected in a memory device of the remote control device along with time and date the channel was selected;
- selecting an auction button on the remote control device indicating an interest in participating in the auction;
- sending the channel selected and the date and time the channel was selected to a remote computer;
- retrieving auction information from a library database, coupled to the remote computer, using the channel selected and the date and time the channel was selected to identify the auction;
- displaying the auction on the viewing device for participation by the user;
- prompting a user to enter a personal identification number (PIN) to confirm identity of the user after selection of the auction;
- sending the PIN and the unique identification number of the remote control device concurrently to the remote computer for use in a successful bid on an item in the auction; and
- confirming on the viewing device the user is a participant in the auction.

2. The method of claim 1, further comprising:
- entering a bid for an item being auctioned off;
- sending the bid to the remote computer causing the bid to be displayed in a list of bids on the viewing device;
- determining a winning bid; and
- notifying a winner by sending notification to a mobile device embedded in the remote control device.

3. The method of claim 1, further comprising:
- establishing a communication link between a mobile device embedded in the remote control device and the remote computer; and
- establishing an instant messaging session between the mobile device embedded in the remote control device and the remote computer for bidding on an item being auctioned off.

4. The method of claim 2, further comprising:
- providing the user with status of bidding process, wherein the status of the bidding process indicates a last bid received in the auction or no bids have been received.

5. The method of claim 4, further comprising adding a pre-determined tax and a service fee to the winning bid.

6. The method of claim 4, further comprising:
- establishing a user account for the user; and
- charging the user account of the user upon determination of the winning bid by the user.

7. The method of claim 4, further comprising compensating an auctioneer of the auction for services rendered, wherein the auctioneer receives a percentage of the winning bid.

8. The method of claim 4, further comprising compensating an auctioneer of the auction for services rendered, wherein the auctioneer is compensated by an advertising sponsor of the auction.

9. The method of claim 1, wherein an owner of the item being auctioned off is charged a fee for auctioning off the item and wherein the fee is a pre-arranged percentage or a flat fee.

10. A remote control device, comprising:
  means for selecting a channel from a list of channels using a remote control device having a unique identification number, each channel in the list of channels associated with a different auction and the selection of the channel determines an auction to view;
  means for recording the channel selected in a memory device of the remote control device along with time and date the channel was selected;
  means for selecting an auction button on the remote control device indicating an interest in participating in the auction;
  means for sending the channel selected and the date and time the channel was selected to a remote computer;
  means for retrieving auction information from a library database, coupled to the remote computer, using the channel selected and the date and time the channel was selected to identify the auction;
  means for displaying the auction on the viewing device for participation by the user
  means for prompting a user to enter a personal identification number (PIN) to confirm identity of the user after selection of the auction;
  means for sending the PIN and the unique identification number of the remote control device concurrently to the remote computer for use in a successful bid on an item in the auction; and
  means for confirming on the viewing device the user is a participant in the auction.

11. The remote control device of claim 10, further comprising:
  means for entering a bid for an item being auctioned off;
  means for sending the bid to the remote computer causing the bid to be displayed in a list of bids on the viewing device;
  means for determining a winning bid; and
  means for notifying a winner by sending notification to a mobile device embedded in the remote control device.

12. The remote control device of claim 10, further comprising:
  means for establishing a communication link between a mobile device embedded in the remote control device and the remote computer; and
  means for establishing an instant messaging session between the mobile device embedded in the remote control device and the remote computer for bidding on an item being auctioned off.

13. The remote control device of claim 11, further comprising:
  means for providing the user with status of bidding process, wherein the status of the bidding process indicates a last bid received in the auction or no bids have been received.

14. A system for participating in an auction, comprising:
  a remote computer, comprising:
    a first memory device; and
    a first processor coupled to the first memory device, the first processor configured to communicate with a remote control device having a unique identification number, the remote control device, comprising:
      a second memory device; and
      a second processor coupled to the second memory device, the second processor configured to
        receive a channel selected by a user using a keypad on the remote control device to view an auction, the channel selected from a listed of channels, each channel in the list of channels associated with a different auction and the selection of the channel determines an auction to view;
        record the channel selected in the second memory device along with time and date the channel was selected;
        receive an indication of an interest in participating in the auction by selection an auction button on the remote control device;
        send the channel selected and the date and time the channel was selected to the remote computer;
        receive auction information from a library database, coupled to the remote computer, using the channel selected and the date and time the channel was selected to identify the auction;
        prompt the user to enter a personal identification number (PIN) to confirm identity of the user after selection of the auction;
        send the PIN and the unique identification number of the remote control device concurrently to the remote computer for use in a successful bid on an item in the auction; and
        receive confirmation the user is a participant in the auction by selection of a button on the remote control device.

15. The system of claim 14, wherein the second processor is further configured to:
  enter a bid for an item being auctioned off; and
  send the bid to the remote computer causing the bid to be displayed in a list of bids on the viewing device.

16. The method of claim 14, wherein the second processor is further configured to:
  establish a communication link with the remote computer; and
  establish an instant messaging session with the remote computer for bidding on an item being auctioned off.

17. The method of claim 1, further comprising:
  activating a mobile device embedded within the remote control device; and
  transmitting data to the remote control using the mobile device.

18. The method of claim 17, wherein where the data includes the channel selected, the date and time the channel was selected, the PIN and the unique identification number of the remote control device.

19. The method of claim 1, wherein the viewing device is an unmodified television.

20. The method of claim 1, further comprising:
  compiling data about the user; and
  selling the compiled data to advertisers.

21. The remote control device of claim 10, further comprising:
  means for activating a mobile device embedded within the remote control device; and
  means for transmitting data to the remote control using the mobile device.

22. The system of claim 14, wherein a mobile device is embedded within the remote control device and wherein the mobile device communicates with the remote computer.

23. The system of claim 14, wherein the first processor configured further configured to:
  receive data from the remote control device, the data including bids on products and/or services in the auction; and
  compile and analyze the data for marketing and research by advertisers and others.

* * * * *